US008000818B1

(12) United States Patent
Bhatt et al.

(10) Patent No.: US 8,000,818 B1
(45) Date of Patent: Aug. 16, 2011

(54) SYSTEMS AND METHODS FOR COORDINATION MOTION INSTRUCTIONS

(75) Inventors: Jatin P. Bhatt, Richmond Heights, OH (US); Jacob S. Baker, Rocky River, OH (US); David R. Mowry, Concord Township, OH (US); Stephen L. Steh, Mentor, OH (US); William C. Schwarz, Shaker Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/434,884

(22) Filed: May 4, 2009

Related U.S. Application Data

(63) Continuation of application No. 10/853,674, filed on May 25, 2004, now Pat. No. 7,529,599, which is a continuation-in-part of application No. 10/675,100, filed on Sep. 30, 2003, now Pat. No. 7,180,253.

(51) Int. Cl.
G05B 11/01 (2006.01)
G05B 19/18 (2006.01)
G05B 19/42 (2006.01)
G06F 19/00 (2011.01)

(52) U.S. Cl. ............ 700/86; 700/17; 700/61; 700/181; 700/188

(58) Field of Classification Search .......... 700/17, 700/61, 86, 181, 188
See application file for complete search history.

(56) References Cited

U.S. PATENT DOCUMENTS

| | | | |
|---|---|---|---|
| 3,656,124 A | 4/1972 | McGee | |
| 4,308,584 A | 12/1981 | Arai | |
| 4,449,196 A | 5/1984 | Pritchard | |
| 4,646,228 A * | 2/1987 | Ikeda | 700/87 |
| 4,786,847 A | 11/1988 | Daggett et al. | |
| 4,829,219 A | 5/1989 | Penkar | |
| 4,887,222 A | 12/1989 | Miyake et al. | |
| 4,890,241 A | 12/1989 | Hoffman et al. | |
| 4,947,336 A * | 8/1990 | Froyd | 700/188 |
| 5,248,922 A | 9/1993 | Meshkat | |
| 5,453,933 A * | 9/1995 | Wright et al. | 700/181 |
| 5,481,652 A | 1/1996 | Sasaki | |
| 5,521,374 A | 5/1996 | Cray et al. | |

(Continued)

OTHER PUBLICATIONS

OA dated Dec. 10, 2010 for U.S. Appl. No. 12/435,521, 22 pages.

*Primary Examiner* — Ronald D Hartman, Jr.
(74) *Attorney, Agent, or Firm* — Turocy & Watson LLP; R. Scott Speroff; John M. Miller

(57) ABSTRACT

The invention provides systems and methods that integrate and/or control motion of a plurality of axes in a motion control environment. Grouped axes can be linked (e.g., via a tag) to provide desired multi-axis coordinated motion as well as provide control for corresponding aspects of motion such as acceleration, velocity, etc. Such axes can be integrated with other control functionality such as process and/or machine control to provide the user with a comprehensive control. The foregoing can provide simple mechanisms for moving devices in multiple axes of a coordinate system in a coordinated fashion. Such coordinated move functionality can provide a user-friendly interface for linear and circular moves in multi-dimensional space. The algorithm employed for path planning can provide fast execution and dynamic parameter changes (e.g., maximum velocity, acceleration and deceleration) along a desired path of motion. In this manner, such instructions can provide smooth transitions from one coordinated move to the next.

17 Claims, 22 Drawing Sheets

U.S. PATENT DOCUMENTS

| | | | |
|---|---|---|---|
| 5,581,672 A | 12/1996 | Letcher, Jr. | |
| 5,625,267 A | 4/1997 | Gregory | |
| 5,892,345 A | 4/1999 | Olsen | |
| 5,923,132 A | 7/1999 | Boyer | |
| 5,955,856 A | 9/1999 | Sato et al. | |
| 5,963,003 A | 10/1999 | Boyer | |
| 6,134,486 A | 10/2000 | Kanayama | |
| 6,167,328 A | 12/2000 | Takaoka et al. | |
| 6,297,610 B1 | 10/2001 | Bauer et al. | |
| 6,300,738 B1 | 10/2001 | Weinhofer | |
| 6,308,113 B1 | 10/2001 | Nowlin et al. | |
| 6,442,442 B1 * | 8/2002 | Weinhofer | 700/86 |
| 6,442,451 B1 | 8/2002 | Lapham | |
| 6,456,897 B1 | 9/2002 | Papiernik et al. | |
| 6,683,432 B2 | 1/2004 | Griffis | |
| 6,782,306 B2 | 8/2004 | Yutkowitz | |
| 6,825,634 B2 | 11/2004 | Tatar et al. | |
| 6,839,663 B1 | 1/2005 | Temkin et al. | |
| 6,865,441 B2 | 3/2005 | Chandhoke | |
| 6,922,606 B1 | 7/2005 | Yutkowitz | |
| 6,922,607 B2 | 7/2005 | Yamazaki et al. | |
| 6,981,417 B1 * | 1/2006 | Oravecz | 73/619 |
| 7,076,322 B2 | 7/2006 | Chandhoke | |
| 2001/0052512 A1 | 12/2001 | Hunter et al. | |
| 2004/0157188 A1 | 8/2004 | Luth et al. | |

* cited by examiner

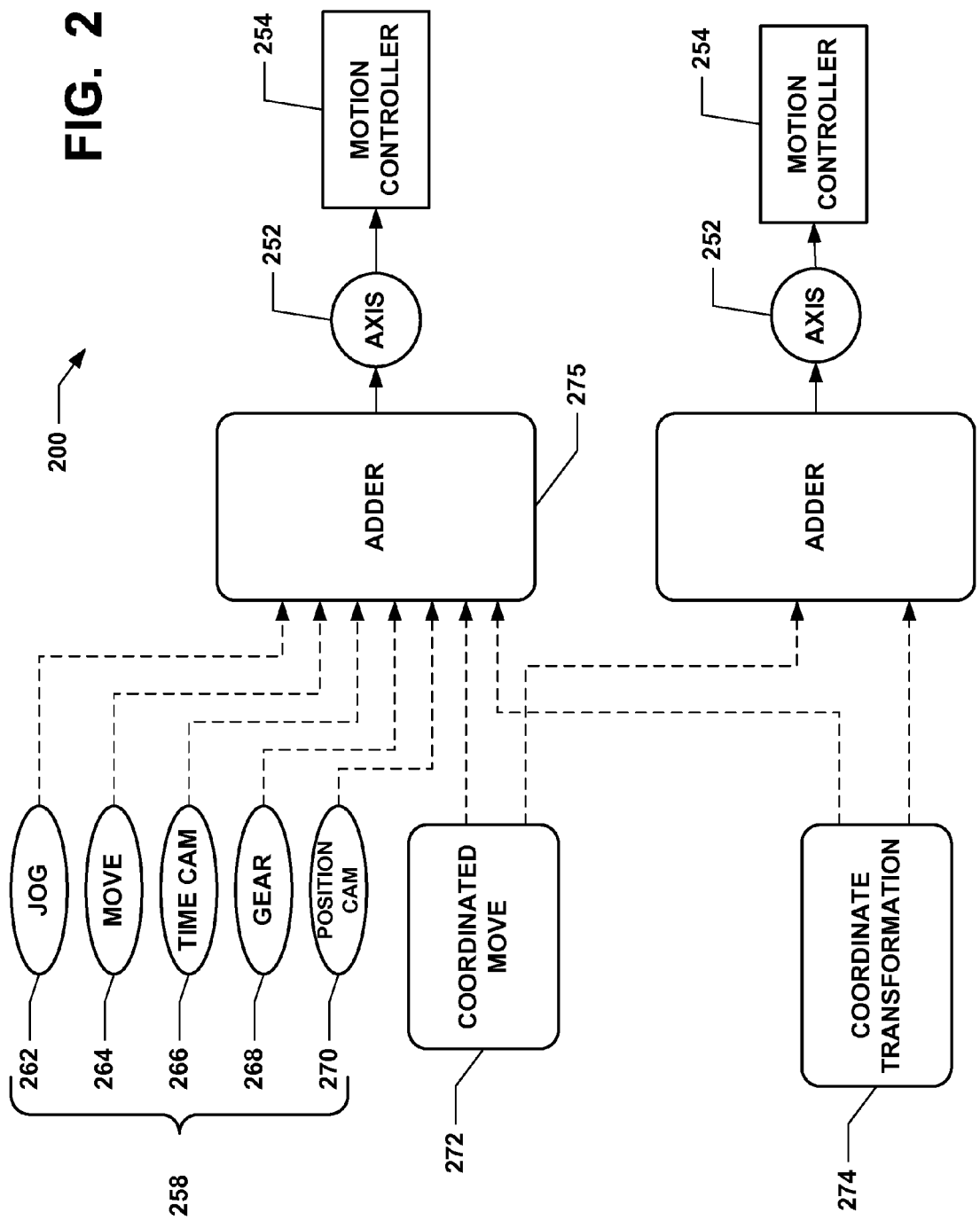

MCLM (CoordinateSystem, MotionControl, MoveType, Position, Speed, SpeedUnits, AccelRate, AccelUnits, DecelRate, DecelUnits, VelocityProfile, TerminationType, Merge, MergeSpeed);

MCCM (CoordinateSystem, MotionControl, MoveType, Position, Speed, SpeedUnits, AccelRate, AccelUnits, DecelRate, DecelUnits, VelocityProfile, TerminationType, Merge, MergeSpeed);

MCCD (CoordinateSystem, MotionControl, MotionTypeChangeSpeed, Speed, SpeedUnits, ChangeAccel, AccelRate, AccelUnits, ChangeDecel, DecelRate, DecelUnits, Scope);

MCS (CoordinateSystem, MotionControl, StopType, ChangeDecel, DecelRate, DecelUnits);

MCSD (CoordinateSystem, MotionControl);

MCSR (CoordinateSystem, MotionControl);

| Bit | TP1 | TP2 | TP3 | TP4 |
|---|---|---|---|---|
| MCLM1.DN | T | T | T | T |
| MCLM1.IP | T | F | F | F |
| MCLM1.AC | T | F | F | F |
| MCLM1.PC | F | T | T | T |
| MCLM2.DN | T | T | T | T |
| MCLM2.IP | T | T | T | F |
| MCLM2.AC | F | T | F | F |
| MCLM2.PC | F | F | F | T |
| cs1.MoveTransitionStatus | F | T | F | F |
| cs1.MovePendingStatus | T | F | F | F |
| cs1.MovePendingQueueFullStatus | T | F | F | F |

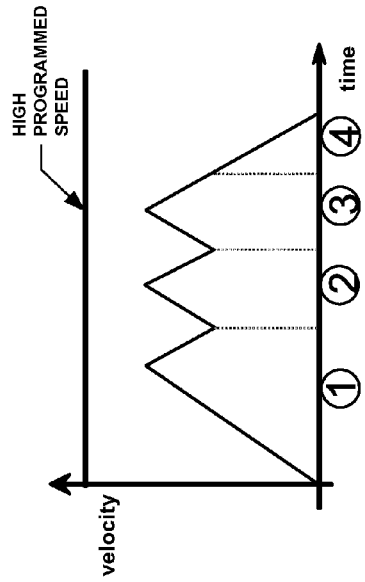
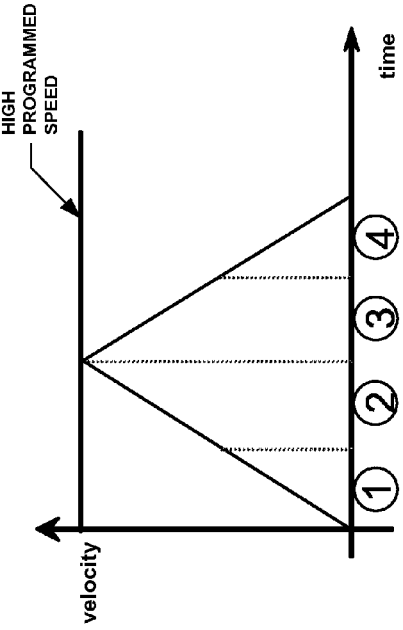
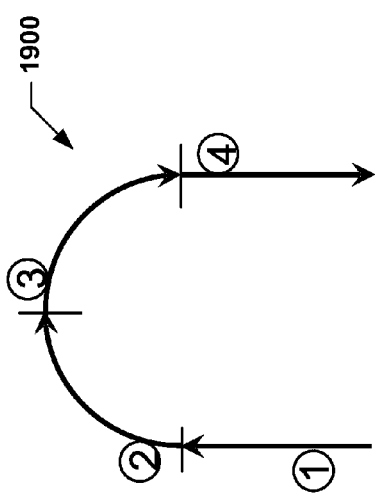
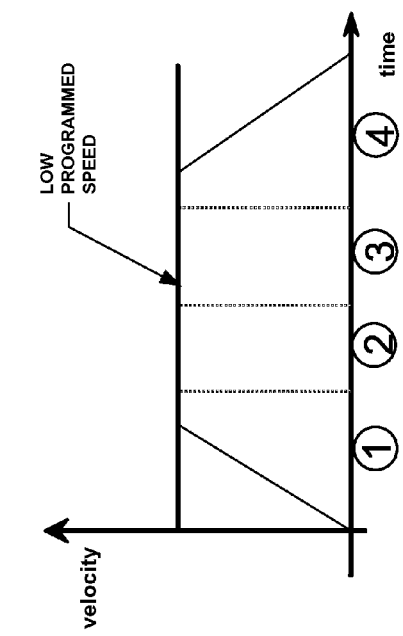
FIG. 19 A
FIG. 19 B
FIG. 19 C
FIG. 19 D

SYSTEMS AND METHODS FOR COORDINATION MOTION INSTRUCTIONS

CROSS REFERENCE TO RELATED APPLICATIONS

This application is a continuation of U.S. application Ser. No. 10/853,674, filed on May 25, 2004, entitled SYSTEMS AND METHODS FOR COORDINATION MOTION INSTRUCTIONS, which is a continuation in part of U.S. application Ser. No. 10/675,100, filed on Sep. 30, 2003, issued U.S. Pat. No. 7,180,253 on Feb. 20, 2007, entitled METHOD AND SYSTEM FOR GENERATING MULTI-DIMENSIONAL MOTION PROFILES. The entireties of the aforementioned applications are incorporated herein by reference.

TECHNICAL FIELD

The present invention relates to industrial control systems, and more particularly to systems and methods for integrated control systems that utilize instructions to act on control objects for multi-axis coordination.

BACKGROUND OF THE INVENTION

Industrial controllers are special purpose processing devices used for controlling industrial processes, machines, manufacturing equipment, and other factory automation applications. In accordance with a control program or routine, an industrial controller may measure one or more process variables or inputs representative of the status of a controlled process, and change outputs effecting control of the process. The inputs and outputs may be binary, (e.g., on or off), and/or analog assuming a continuous range of values. The control routine may be executed in a series of execution cycles with batch processing capabilities, and may comprise one or more functional units. Such a control routine may be created in a controller configuration system having tools and interfaces whereby a user may implement a control strategy using programming languages or graphical representations of control functionality. The control routine may be downloaded from the configuration system into one or more controllers for implementation of the control strategy in controlling a process or machine.

The measured inputs received from a controlled process and the outputs transmitted to the process can pass through one or more input/output (I/O) modules in a control system, which serve as an electrical interface between the controller and the controlled process, and can be located proximate or remote from the controller. The inputs and outputs can be recorded in an I/O table in processor memory. Input values can be asynchronously read from the controlled process by one or more input modules and output values can be written directly to the I/O table by a processor for subsequent communication to the process by specialized communications circuitry. An output module may interface directly with a controlled process, by providing an output from an I/O table to an actuator such as a motor, drive, valve, solenoid, and the like.

During execution of the control routine, values of the inputs and outputs exchanged with the controlled process pass through the I/O table. The values of inputs in the I/O table may be asynchronously updated from the controlled process by dedicated scanning circuitry. This scanning circuitry may communicate with input and/or output modules over a bus on a backplane or network communications. The scanning circuitry may also asynchronously write values of the outputs in the I/O table to the controlled process. The output values from the I/O table may then be communicated to one or more output modules for interfacing with the process. Thus, a controller processor may simply access the I/O table rather than needing to communicate directly with the controlled process.

In distributed control systems, controller hardware configuration may be facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other control programs or routines.

Various control modules of a distributed industrial control system may be spatially distributed along a common communication link in several racks. Certain I/O modules may thus be located proximate a portion of the control equipment, and away from the remainder of the controller. Data may be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

Such control systems can be employed via an industrial controller to control motion related to a plurality of applications. Motion control can be employed to control motors, etc. related to industrial control systems for manufacturing, processing, automation, measurement, material handling, robotics, assembly, etc. For example, a desired product manufactured on a production line can have a measurement apparatus that moves along with each product to insure quality throughout production. Such a measurement device will need to travel in a precise, controlled manner to provide accurate data. Some systems utilize several motors to control the position of a component. In such applications, it would be desirable to control the motors in a coordinated manner.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later. The invention provides instructions that execute in a programming environment (e.g., programmable logic controller) associated with a coordinate system object which contains a plurality of disparate axes.

According to one aspect of the subject invention, a motion control system for an industrial controller comprising: a control object that represents one or more axes of motion; and an instruction component that executes at least one instruction on the control object, the instruction is employed to act on at least one operand associated with the axes of motion.

According to another aspect of the subject invention, a method employed to execute an instruction to effectuate motion control, comprising: creating at least one control object that represents at least one axis of motion, wherein the at least one axis is associated with a coordinate system; generating at least one instruction to act on a control object; associating the at least one instruction with the at least one control object; and executing at least one instruction that specifies motion on the coordinate system.

According to yet another aspect of the subject invention, a system for utilizing a plurality of instructions to execute on a coordinate system tag, means for: creating a coordinate system tag which represents at least one of the control parameters of at least one axis of motion; executing a first instruction upon the coordinate system tag; queuing a second instruction to subsequently operate on the coordinate system tag; and blending the first instruction with the second instruction to provide a transition path between the instructions.

According to still yet another aspect of the subject invention, a motion control system comprising control logic and a programming interface, the programming interface being configured to permit a user to specify a plurality of path segments, and the control logic being configured to generate a plurality of additional transitioning path segments substantially extending between the path segments, and wherein the control logic is configured to generate control signals to control operation of a plurality of motion axes to drive movement of an element along a path defined by the various path segments and the additional transitioning path segments.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 2 illustrates a system with exemplary elements of a programming interface usable to program a motion control system, in accordance with an aspect of the current invention.

FIG. 19 shows speed to time based relationship, in accordance with an aspect of the current invention.

DETAILED DESCRIPTION OF THE INVENTION

Figure 1:
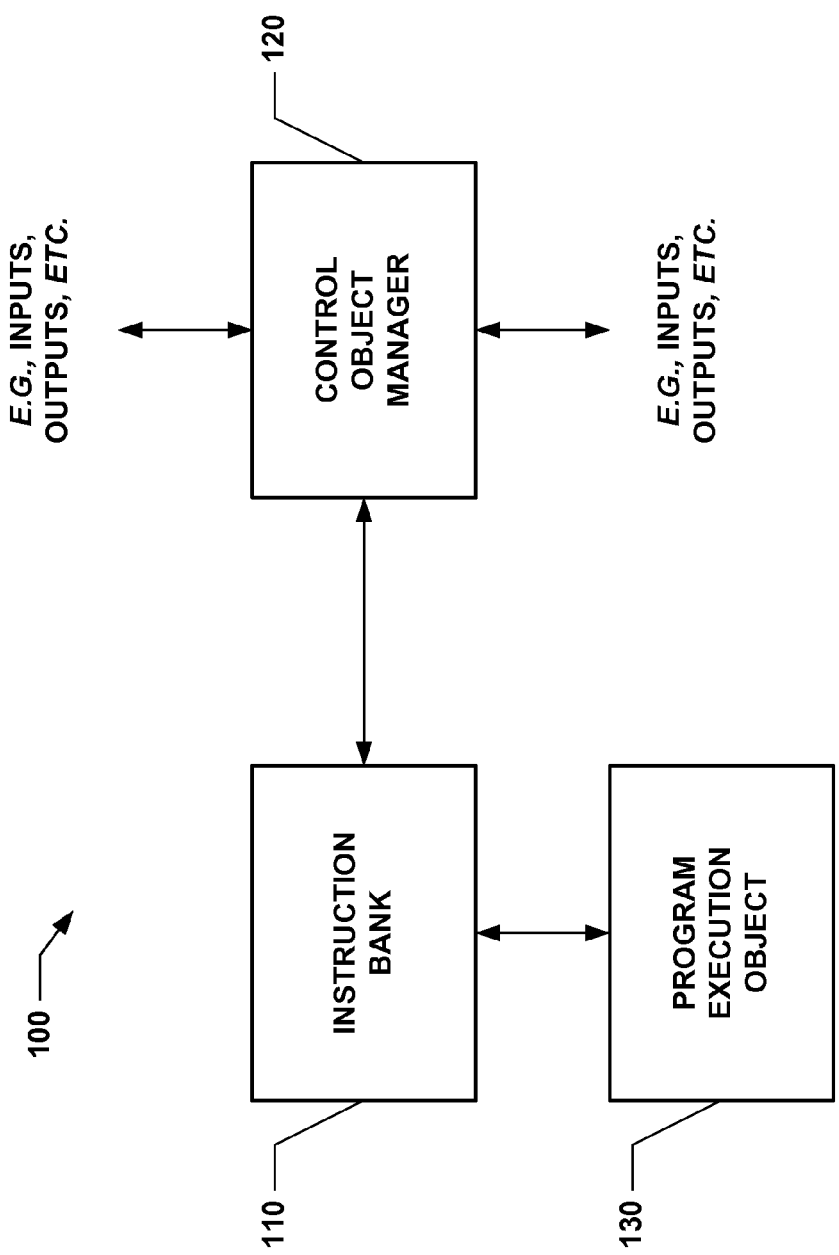
FIG. 1 illustrates an exemplary control object manager system, in accordance with an aspect of the current invention.

The various aspects of the present invention will now be described with reference to the drawings, wherein like reference numerals are used to refer to like elements throughout. The invention provides systems and methods that integrate and/or control motion of a plurality of axes in a motion control environment. Grouped axes can be linked (e.g., via a tag) to provide desired multi-axis coordinated motion as well as provide control for corresponding aspects of motion such as acceleration, velocity, motion type, profile, termination type and motion control, for example. To facilitate such control, instructions can be executed to configure and/or program multi-axis coordinated motion. The foregoing can provide simple mechanisms for moving devices in multiple axes of a coordinate system in a coordinated fashion.

Such functionality can be provided in a user-friendly interface for linear and circular moves in multi-dimensional space (e.g., Cartesian coordinate system). The algorithm employed for path planning can provide fast execution and dynamic parameter changes (e.g., maximum velocity, acceleration and deceleration) along a desired path of motion. In this manner, such instructions can provide smooth transitions from one coordinated move to the next.

Turning now to the figures, FIG. 1 is a system 100 that contains an instruction bank 110, a control object manager (COM) 120, and a program execution object (PEO) 130. The COM 120 can be employed to control various aspects of a system such as process, motion, machine and the like. The COM 120 can be employed to manage a plurality of objects that represent hardware and/or software components. The COM 120 can further contain an interface (not shown)

employed to allow a user to view, organize and modify the objects contained therewith. In addition, the COM 120 can facilitate interaction between a plurality of control objects. For example, if each control object represents a hardware axis of motion, then parameters relating to motion on one axis can be correlated to parameters relating to motion on other axes.

The instruction bank 110 and object manager 120 can be employed in various environments (e.g., software, hardware, etc.) to provide desired connectivity to the hardware and/or software components represented by the control objects. For example, the COM 120 can employ a software interface (not shown) to manage a plurality of control objects that represent hardware components. The instruction bank 110 can contain one or more instructions and each instruction can be related to any number of parameters associated with the control objects in the COM 120. A queuing component (not shown) can be implemented to provide a means of storing subsequent instruction(s) to be employed as needed. Additionally, the COM 120 can facilitate the transfer of execution of one instruction to another. Thus, the instructions can be blended to insure a smooth transition and operability of the components related to respective control objects. In addition, instructions can be created, edited and stored within the instruction bank 110. In this manner, created instructions sets can be stored to be utilized as desired by disparate users.

The instruction bank 110 can interface to the COM 120 to facilitate control of objects associated with the COM 120 and a hierarchy of control can be established for this purpose. For example, a task can be user assigned to complete a specified set of programs and each program can have routines related to various particular control aspects. In this manner, each routine can run instructions (e.g., MCLM, MCCM, MCCD, . . . ) that provides control to various desired motion commands. Various languages can be employed to run each routine such as IEC 1131 function block, structured text, sequential function and the like. The PEO 130 can be employed to execute instructions related to various desired control objects. A memory (not shown) and/or processor (not shown) can be connected to the PEO 130 and facilitate the execution of instructions from the instruction bank 110. Execution can be accomplished on a one time basis, periodic basis or based on the satisfaction of a condition, for example. The PEO 130 can be a software or hardware object and can provide an environment to execute instructions from the instruction bank. Thus, the PEO 130 can be a dedicated application, a specific programming language, a particular software application, etc.

Similarly, control objects can be created, modified and stored within the COM 120. The COM 120 can facilitate relationships with the components such objects represent. Once connectivity is established, control information can be gathered and provided as a means to change desired inputs and/or outputs relating to the component. In addition, a plurality of objects can be associated with a single object such that by implementing such an object, control information can be aggregated and controlled. Thus, a single object can have instructions executed thereon, which in turn can control a plurality of objects.

FIG. 2 is a functional block diagram 200 showing building blocks embodied in a programming interface usable to program a control system. The building blocks include one or more motion control axis blocks 252 and a plurality of motion control blocks 258. The motion control blocks 258 further include one or more jog blocks 262, one or more move blocks 264, one or more time cam blocks 266, one or more gear blocks 268, one or more position cam blocks 270, one or more coordinated move blocks 272, and one or more coordinate transformation blocks 274. The motion control blocks 258 also include an adder block 275, which combines inputs (e.g., incremental position command values) from the remaining motion control blocks 258.

In one approach, the building blocks 252-258 are implemented as objects in an object-oriented programming environment. In an object-oriented programming environment, individual objects typically represent different physical objects (e.g., motors, sensors, etc.), relationships between physical objects (e.g., camming relationships, gearing relationships, etc.), and so on. The objects are then accessed by instructions in a user program to affect operation of the physical objects or relationships there between. Thus, the axis blocks 252 can each be implemented as an object having services that can be invoked using one or more axis instructions. Further, each of the motion control blocks 258 can be implemented as objects (e.g., a jog object, a move object, a time cam object, a gear object, a position cam object, a coordinated move object, and a coordinate transformation object) having services that may be invoked using one or more respective instructions (e.g., a jog instruction, a move instruction, a time cam instruction, a gear instruction, a position cam instruction, a coordinated move instruction, and a coordinate transformation instruction).

In designing such a system, new instances of the above-mentioned objects can be created to represent new/additional devices or relationships between devices. Thus, although a small number of building blocks 252-258 is shown, it will be appreciated that this configuration is purely for purposes of explanation and that practical systems are likely to have a configuration different than that shown in FIG. 2, typically with many additional ones of the building blocks 252-258. For example, new instances of the axis object may be created to represent each additional motion control axis (e.g., a motor, a shaft or other device driven by a motor, virtual axis, and so on), and various axis instructions may be incorporated into a user program to invoke the services of the axis objects. The axis instructions can then be executed to control movement of the motion control axes (e.g., to control a position such as an absolute position, relative position, delta position, etc., of the motion control axis). Other instructions can be executed to control output devices using the services of the motion controller 254, for example, as a function of motor position (actual or measured).

The motion control blocks 258 allow the motion control axis to be controlled in different ways. The jog block 262 permits the user (via a jog instruction) to specify a new velocity at which the shaft of the motor is to move. The move block 264 permits the user (via a move instruction) to specify a new position for the shaft of the motor. The time cam block 266 permits the user (via a time cam instruction) to specify an axis position profile which specifies axis position as a function of time. The gear cam block 268 permits the user (via a gear instruction) to specify an electronic gearing relationship between the shaft of the motor and the shaft of another motor (not shown) in the system. The position cam block 270 permits the user (via a position cam instruction) to specify an axis position profile which specifies axis position for the shaft of the motor as a function of a position of the shaft of another motor (not shown) in the system. In the case of the gear block 264 and the position cam block 270, it will be appreciated that these blocks will receive inputs from other axis blocks similar to the axis block 252, which can in turn receive inputs from motion blocks similar to the motion blocks 258. The coordinate move block 272 and the coordinate transformation block 274 are described in greater detail below. It is therefore seen that the complexity of the motion control system can be increased by providing multiple axes (and therefore multiple motors or other devices) and defining various relationships between the axes and other devices. Fewer, more, or different building blocks and instructions may also be used. Of course, it should be understood that these features, and all of the other features described herein, may also be implemented without using object-oriented techniques. It may also be noted, however, that virtual axes may also be used. Accordingly, in some cases, axis blocks 252 may be used in situations where there is no associated physical motor.

The control logic associated with each of the axis blocks 252 generates control signals for a respective one of the motors responsive to inputs from the adder block 275. For example, in the preferred embodiment, described in greater detail below, the coordinated move block generates incremental position reference commands for each motion control axis block 252. Each axis block 252 uses the position reference commands as input to the nested feedback control arrangement in the motion controller 254. The position of the motor is monitored by a feedback device (not shown) which provides feedback information to the axis block 252. Alternatively, the feedback device may be used to monitor the position of a device driven by the motor.

The coordinated move block 272 and the coordinate transformation block 274 will now be described in greater detail. The coordinated move block 272 provides a programmer of the system with user-friendly mechanisms for controlling motion of multiple motion control axes (e.g., multiple motors) in a coordinated fashion. The coordinate transformation block 274 provides the programmer with a mechanism for relating the axes of one coordinate system to the axes of another coordinate system. Although two axes are shown, it will be understood that the blocks 272 and 274 can be employed in connection with three axes or any other number of axes. If an object oriented approach is used, interfaces to the coordinated move block 272 and the coordinate transformation block 274 can be provided by way of one or more multi-axis coordination instructions.

The coordinated move block 272 preferably provides an interface for linear moves in multi-dimensional space and circular moves in two and three-dimensional space. The preferred algorithm used for the path planning permits dynamic parameter changes for maximum velocity, acceleration, and deceleration along the path. It also provides smooth transitions (without spikes in acceleration) from one coordinated move path segment to the next.

The coordinate transformation block 274 preferably provides an interface for relating the axes of a source coordinate system to the axes of the target coordinate system. The possible source and target systems may include coordinate systems in multi-dimensional space, cylindrical and spherical coordinate systems in two- and three-dimensional space, and independent and dependent kinematic coordinate systems in two- and three-dimensional space. The coordinate transformation block 274 enables translation and rotation from the source to the target system.

Figures 3A, 3B:
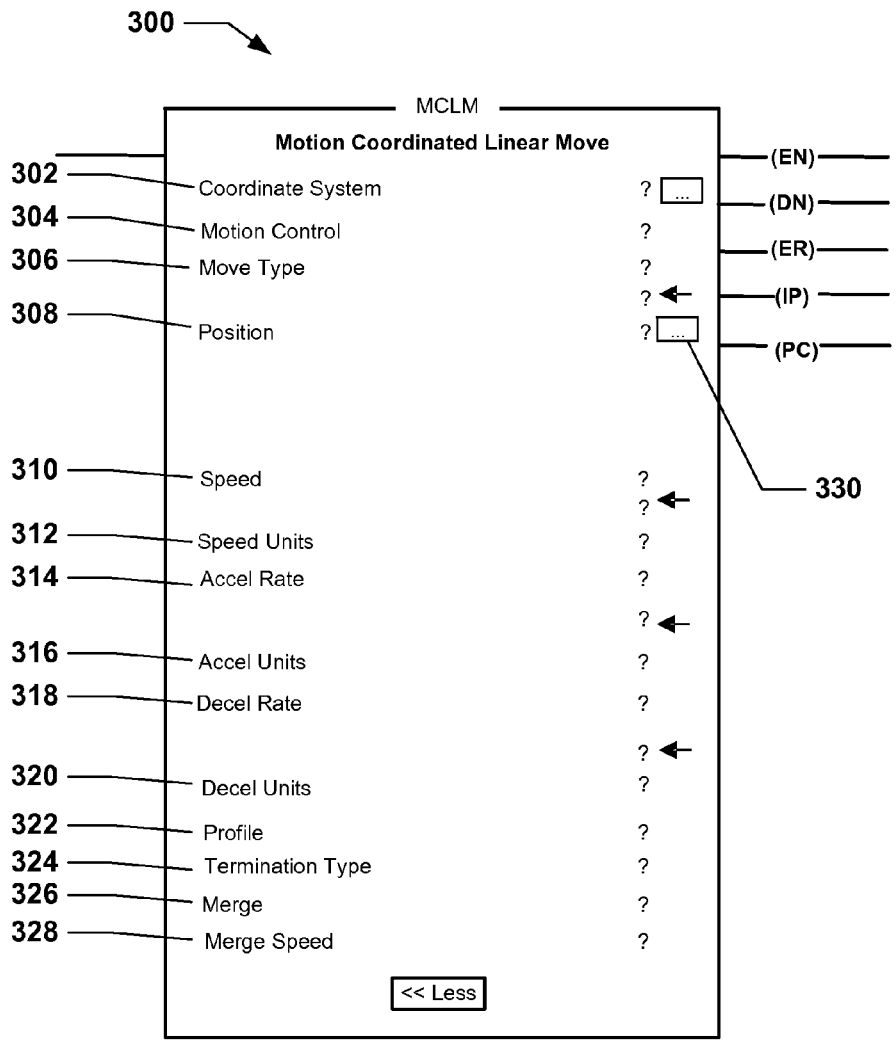
FIG. 3 illustrates an exemplary instruction faceplate, in accordance with an aspect of the current invention.

Turning now to FIGS. 3A and 3B, that show a Motion Coordinated Linear Move (MCLM) instruction 300 as it can appear to a user and can be utilized with various programming languages such as ladder logic (FIG. 3A) and structured text (FIG. 3B), for example. The MCLM instruction can initiate a multi-dimensional linear coordinated move for the specified axes within a coordinate system. The new position can be defined as an absolute or incremental position.

In one example, the MCLM instruction 300 includes the following operands: a coordinate system operand 302, a motion control operand 304, a move type operand 306, a position operand 308, a speed operand 310, a speed units operand 312, an accel rate operand 314, an accel units operand 316, a decel rate operand 318, a decel units operand 320, a profile operand 322, a termination type operand 324, a merge operand 326 and a merge speed operand 328. As described below, the operands 302-328 are user-configurable parameters that configure the coordinated linear move initiated by the execution of the of the MCLM instruction 300. A user can interface to the instruction 300 via a target position dialogue box launched by a button 330 which allows a user to modify various parameters associated with a move such as axis name, target position, actual position, set targets, set vias and the like.

The coordinate system operand 302 specifies the system of motion axes that defines the coordinates of a coordinate system. Axes can be configured at least as primary or ancillary, for example. Axes configured as primary axes are included in the velocity calculations while axes configured as ancillary axes are ignored for these calculations. Each axis can be commanded to move at a speed so that it reaches its respective endpoint at the end of the computed time interval. For most cases, the above will result in a move in which the primary axes move at the programmed speed along the linear move from their start point to their endpoint and the ancillary axes move at whatever speed is needed so that all the axes reach their respective endpoints at substantially the same time.

The speed of each coordinated axis move can be a function of the mode of the move (e.g., commanded speed or percent of max speed) and the combination of axes that have been commanded to move, that is, primary and ancillary axes with non-zero incremental departures. The speed of the move can be computed as follows: the time to complete the vector move can be computed at the programmed speed utilizing only the primary axes and the time to complete move at the programmed speed for each ancillary axis is computed. The longest of these times (time for the vector move or time for the move of each ancillary axis) is employed as the time for the entire move. Each axis will be commanded to move at a speed so that it reaches its respective endpoint at the end of the computed time interval. For most cases, the above will result in a move in which the primary axes move at the programmed speed along the vector from their start point The motion control operand 304 stores status information during execution of the MCLM instruction. This information includes whether execution is in process, error information and the like. The motion control operand 304 can be employed by various control systems and/or processes to monitor the status of the MCLM instruction. For example, such information can designate the start of an aspect of the MCLM instruction which can be utilized to initiate a disparate control system. A listing of exemplary control bits and error codes is given below.

| Operands | |
|---|---|
| Operand | Description |
| Coordinate System | coordinated group of axes |
| Motion control | structure used to access instruction status parameters |
| Move type | Select the Move Type<br>0 = Absolute<br>1 = Incremental |
| Position | [coordination units] |
| Speed | [coordination units] |
| Speed units | 0 = Units per second<br>1 = % of maximum |

-continued

| Operand | Description |
|---|---|
| Accel rate | [coordination units] |
| Accel units | the units for the acceleration field<br>0 = units per sec$^2$<br>1 = % of maximum |
| Decel rate | [coordination units] |
| Decel units | the units for the deceleration field<br>0 = units per sec$^2$<br>1 = % of maximum |
| Profile | 0 = trapezoidal<br>1 = S-curve |
| Termination Type | 0 = Actual Tolerance<br>1 = No Settle<br>2 = Command Tolerance<br>3 = No Decel<br>4 = Contour with Velocity Constrained<br>5 = Contour with Velocity Unconstrained |
| Merge | 0 = disabled<br>1 = Coordinated Motion<br>2 = All Motion |
| Merge speed | 0 = programmed value in the speed field<br>1 = current axis speed |

The MCLM instruction can set the following error codes in the Motion Instruction when an error occurs.

Error Codes

| Name | Description. |
|---|---|
| Servo Off State | The servo loop of at least one of the axes may not be closed. |
| Shutdown State | At least one of the axes can be in the shutdown state. |
| Illegal Axis Type | At least one of the axes may not be configured as a servo or virtual axis. |
| Overtravel Condition | At least one of the axes can be trying to move in a direction that violates the current overtravel condition. |
| Axis Not Configured | At least one of the axes may not be configured. |
| Parameter Out of Range | The value of at least one parameter can be outside the legal range limit:<br>1. The move type is less than 0 or greater than 1. (Extended Error = 2)<br>2. The size of the position array is not large enough to provide positions for all of the axes in the specified coordinate system. (Extended Error = 3)<br>3. The speed is less than 0. (Extended Error = 4)<br>4. The accel rate is less than or equal to 0. (Extended Error = 6)<br>5. The decel rate is less than or equal to 0. (Extended Error = 8)<br>6. The termination type is less than 0 or greater than 3. (Extended Error = 11) |
| Homing in Process Error | At least one of the axes can be executing a homing sequence. |
| Motion Group Not Synchronized | The motion group associated with the axes may not be synchronized. |
| Axis in Faulted State | At least one of the axes can be in a faulted state. |
| Illegal Controller Mode | The current operating mode of the controller may not support the instruction. |
| Illegal Axis Data Type | At least one of the axes may not be configured as an axis data type that can accept a command. |
| Coordinate System Queue Full | The coordinate system queue contains the maximum number of queued coordinate system motion instructions. |
| Coordinate System Not Configured | The coordinate system may not be configured. |
| Invalid Actual Tolerance | The termination type can be actual and the actual tolerance range defined in the coordinate system is less than or equal to 0. |
| Coordinated Motion in Process Error | At least one of the axes can be currently undergoing coordinated motion through another coordinate system. |

The move type operand 306 can define the method by which the position array is utilized to indicate the path of the coordinated move. An absolute move type can be defined by a position array and provide an axes move directly to a new position. For rotary axes, a positive value indicates that a position should be moved in the clockwise direction, and a negative value indicates that the position should be moved to in the counterclockwise direction.

An incremental move type can define an axes move directly to a new position defined by the sum of a position array and an old position. For rotary axes, a positive value indicates that the position should be moved to in the counterclockwise direction, and a negative value indicates that the position should be moved to in the counterclockwise direction. Also, the value for an incremental rotary move can be used in the current state, possibly creating a move that could move multiple revolutions.

The position operand 308 can be employed to define either the new absolute or incremental position depending on the selected move type. The position can be a one-dimensional array whose dimension is defined to be at least the equivalent of a number of axes in the coordinate system.

The speed operand 310, the accel rate operand 314 and the decel rate 318 can define the maximum speed, acceleration and deceleration along a path of a coordinated move. The speed units operand 312, the accel units operand 316 and the decel units operand 320 can define the units applied to the values of speed, accel rate and decel rate, either directly in the coordination units of a specified coordinate system or as a percentage of the maximum values defined in a specified coordinate system in coordination units, for example. The profile operand 322 can define if a coordinated move follows a trapezoidal or S-curve profile.

The termination type operand 324 can define the method by which the MCLM instruction blends its path into a possible subsequent instruction (e.g., MCCM, MCLM, etc.) An "Actual Tolerance" termination type can terminate the MCLM instruction when the vector position lag for the primary axes and the position lag for each ancillary axis is less than the actual tolerance. The position lag can be the commanded position minus the actual position and can be computed after the entire linear move has been interpolated, that is, when the distance to go equals zero. A possible following instruction (MCLM, MCCM, etc.) can then begin. A "No Settle" termination type can terminate the MCLM instruction when the entire linear move has been interpolated (e.g., vector distance-to-go=0). A possible following MCLM or MCCM instruction can then begin. A "Command Tolerance" termination type can terminate the MCLM instruction when the vector distance-to-go for the primary axes and the distance-to-go for each ancillary axis is less than the command tolerance. The distance-to-go is the distance from the programmed endpoint to the commanded position. A subsequent MCLM or MCCM instruction, for example, can then begin. If there is no following MCLM or MCCM instruction, the move will degenerate to a "No Settle" termination type. A "No Decel" termination type can terminate an MCLM instruction when the entire linear move has been interpolated up to the deceleration point. The deceleration point of the move is dependent on the profile chosen (trapezoidal or S-curve). A subsequent MCLM or MCCM instruction can then begin. If there is no following MCLM or MCCM instruction, the move will degenerate to a "No Settle" termination type. A "Contour with Velocity Constrained" termination type can terminate the linear move when the entire linear move has been interpolated (e.g., vector distance-to-go=0). However, the speed at which it transitions to the next move can be the specified speed for the current move if the next move speed is higher, or the specified speed for the next move if the next move speed is lower or the maximum speed at which the next move can be started if the next move is short.

A "Contour with Velocity Unconstrained" termination type can terminate the linear move when the entire linear move has been interpolated (e.g., vector distance-to-go=0). However, the speed at which it transitions to the next move can be the specified speed for the current move if the next move speed is higher, or the specified speed for the next move if the next move speed is lower The merge operand 326 can define whether to turn the motion of all specified axes into a pure coordinated move. If the merge operand is enabled, the merge speed operand 328 can define whether the current speed or the programmed speed is utilized as the maximum speed along the path of a coordinated move. A "Disabled" merge will not affect the currently executing single axis motion instructions involving any axes defined in the specified coordinate system. Also, any coordinated motion instructions involving the same specified coordinate system will not be affected by the activation of this instruction, and its termination type can affect this instruction. A "Coordinated Motion" merge can terminate any currently executing coordinated motion instructions involving the same specified coordinate system, and the prior motion can be merged into the current move at the speed defined in the merge speed operand 328. Also, substantially all pending coordinated motion instructions can be cancelled. Any currently executing system single axis motion instructions involving any axes defined in the specified coordinate system will not be affected by the activation of this instruction, and can result in superimposed motion on the affected axes. An "All Motion" merge can terminate any currently executing single axis motion instructions involving any axes defined in the specified coordinate system, and any currently executing coordinated motion instructions involving the same specified coordinate system. The prior motion can be merged into the current move at the speed defined in the merge speed parameter. Also, any pending coordinated motion instructions can be cancelled.

Figures 4A, 4B:
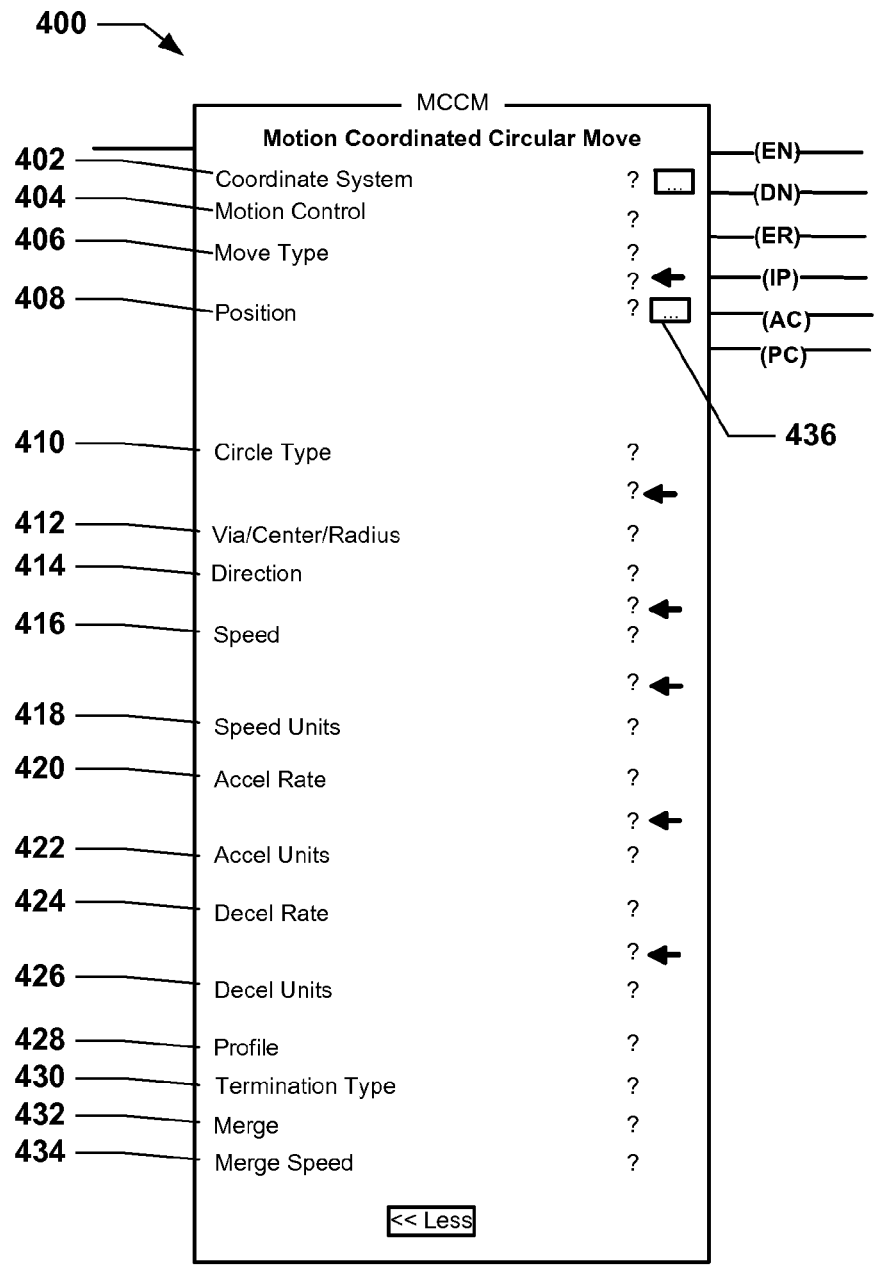
FIG. 4 illustrates an exemplary instruction faceplate, in accordance with an aspect of the current invention.

Turning now to FIGS. 4A and 4B, which illustrates a Motion Coordinated Circular Move (MCCM) instruction 400 as it appears to the user in a particular programming language such as ladder logic (FIG. 4A) and structured text (FIG. 4B). The MCCM instruction can be employed for at least two axes to control the motion of a desired component. For example, the MCCM instruction can initiate a two or three dimensional circular coordinated move for specified axes within a coordinate system. The location of desired positions can be defined as an absolute position (e.g., (3, 7) within a two dimensional coordinate system) or incremental position (e.g., +5 units in the x-axis and −4 units in the y-axis within a 2-dimensional coordinate system relative to the current position).

In one approach, as shown in FIG. 4, the MCCM instruction 400 includes the following operands: a coordinate system operand 402, a motion control operand 404, a move type operand 406, a position operand 408, a circle type operand 410, a via/center/radius operand 412, a direction operand 414, a speed operand 416, a speed units operand 418, an acceleration rate operand 420, an acceleration units operand 422, a deceleration rate operand 426, a velocity profile operand 428, a termination type operand 430, a merge operand 432 and a merge speed operand 434. As described below, the operands 402-434 are user-configurable parameters that configure the coordinated circular move initiated by the execution of the of the MCCM instruction 400. A user can interface to the instruction 400 via a target position dialogue box launched by button 436 which allows a user to modify various parameters associated with a move such as axis name, target position, actual position, set targets, set vias and the like.

The coordinate system operand 402 specifies the system of motion axes that define the coordinates of a coordinate system. Such a system can contain any number of axes and each axis can be designated as primary or ancillary. Axes that are designated as primary axes can be employed to calculate speed. In contrast, axes that have been designated as ancillary can be ignored for such calculations. Additionally, axes that are configured as primary can participate in the actual circular move whereas ancillary axes can move as their axis type (e.g., linear or rotary) has been configured.

The speed of each coordinated move is a function of both the mode of the move (e.g., commanded speed or percent of maximum speed) and the combination of axes that have been commanded to move. Such a combination of axes can include the primary and ancillary axes with non-zero incremental departures. The speed of the move can be computed in the following manner. The time to complete the circular move is computed at the programmed speed utilizing only the primary axis and the time to complete the circular move for each ancillary axis is computed. The longest of these times (e.g., time for circular move or time for the move of each ancillary axis) is utilized as the time for the entire move. Each axis can be commanded to move at a speed so that it reaches its respective endpoint at the end of the computed time interval. For most cases, the above will result in a move in which the primary axes move at the programmed speed along the circle from their start point to their endpoint and the ancillary axes move at whatever speed is needed so that all the axes reach their respective endpoints at substantially the same time.

The motion control operand 404 stores status information during execution of the MCCM instruction. This information includes whether execution is in process, error information and the like. The motion control operand 404 can be employed by various control systems and/or processes to monitor the status of the MCCM instruction. For example, such information can designate the completion of an aspect of the MCCM instruction which can be utilized to trigger a different control system. A listing of exemplary control bits and error codes is given below.

The MCCM instruction and the coordinated move object affect the following control bits of the Motion Instruction.

| Operands | |
|---|---|
| Operand | Description |
| Coordinate System | coordinated group of axes |
| Motion control | structure used to access instruction status parameters |
| Move type | 0 = Absolute<br>1 = Incremental |
| Position | [coordination units] |
| Circle Type | 0 = Via<br>1 = Center<br>2 = Radius<br>3 = Center Incremental |
| Via/Center/Radius | [coordination units] |
| Direction | 2D      3D<br>0 = CW    Shortest<br>1 = CCW    Longest<br>2 = CW Full    Shortest Full<br>3 = CCW Full    Longest Full |
| Speed | [coordination units] |
| Speed units | 0 = Units per second<br>1 = % of maximum |
| Accel rate | [coordination units] |
| Accel units | the units for the acceleration field<br>0 = units per sec$^2$<br>1 = % of maximum |
| Decel rate | [coordination units] |
| Decel units | the units for the deceleration field<br>0 = units per sec$^2$<br>1 = % of maximum |
| Profile | 0 = trapezoidal<br>1 = S-curve |
| Termination Type | 0 = Actual Tolerance<br>1 = No Settle<br>2 = Command Tolerance<br>3 = No Decel<br>4 = Contour with Velocity Constrained<br>5 = Contour with Velocity Unconstrained |
| Merge | 0 = disabled<br>1 = Coordinated Motion<br>2 = All Motion |
| Merge speed | 0 = programmed value in the speed field<br>1 = current axis speed |

In addition, the MCCM instruction sets the following error codes in the Motion Instruction when an error occurs.

Error Codes

| Name | Description |
|---|---|
| Servo Off State | The servo loop of at least one of the axes may not be closed. |
| Shutdown State | At least one of the axes can be in the shutdown state. |
| Illegal Axis Type | At least one of the axes may not be configured as a servo or virtual axis. |
| Overtravel Condition | At least one of the axes can be trying to move in a direction that violates the current overtravel condition. |
| Axis Not Configured | At least one of the axes may not be configured. |
| Parameter Out of Range | The value of at least one parameter is outside the legal range limit:<br>1. Number or primary axes may not be 2 or 3. (Extended Error = 0)<br>2. The move type can be less than 0 or greater than 1. (Extended Error = 2)<br>3. The size of the position array or the via/center array may not be large enough to provide positions for all of the axes in the specified coordinate system or defining via/center point. (Extended Error = 3 or 5)<br>4. The circle type can be less than 0 or greater than 4. (Extended Error = 4)<br>5. The direction can be less than 0 or greater than 3. (Extended Error = 6)<br>6. The speed can be less than 0. (Extended Error = 7)<br>7. The accel rate can be less than or equal to 0. (Extended Error = 9)<br>8. The decel rate can be less than or equal to 0. (Extended Error = 11)<br>9. The termination type can be less than 0 or greater than 3. (Extended Error = 14) |
| Homing in Process Error | At least one of the axes can be executing a homing sequence. |
| Motion Group Not Synchronized | The motion group associated with the axes may not be synchronized. |
| Axis in Faulted State | At least one of the axes is in a faulted state. |
| Illegal Controller Mode | The current operating mode of the controller may not support the instruction. |
| Illegal Instruction | The circle type can be radius and the number of primary axes is not 2. |
| Illegal Axis Data Type | At least one of the axes may not be configured as an axis data type that can accept a command. |
| Coordinate System Queue Full | The coordinate system queue contains the maximum number of queued coordinate system motion instructions. |
| Circular Co-linearity Error | The points defining the circle can lie along a line. |
| Circular Start Equals End Error | The points defining the circle can lie along a line. Specific Co-linear error. |
| Circular R1-R2 Mismatch Error | The radius from end point to center may not be within 15% of radius from start point to center. |
| Circular Infinite Solutions Error | The points defining the circle can define multiple valid solutions. |
| Circular No Solutions Error | The points defining the circle define no valid solution. |
| Circular Small Radius Error | The radius can be less than .01. |
| Coordinate System Not Configured | The coordinate system may not be configured. |
| Invalid Actual Tolerance | The termination type can be actual and the actual tolerance range defined in the coordinate system is less than or equal to 0. |
| Coordinated Motion in Process Error | At least one of the axes can be currently undergoing coordinated motion through another coordinate system. |

The move type operand 406 defines the method by which the position array can be employed to indicate the path of the coordinated move, and the method by which the via/center/radius operand 412 (discussed below) is utilized to indicate the via and center circle types. An absolute move type can be utilized to designate a particular position within the coordinate system as noted above. In this scenario, the primary axes move along a circular path to the new position, which is defined by the position array. The ancillary axes move directly to the new position, which is defined as the position array. For rotary axes, a positive value can be indicative of motion in the clockwise direction whereas a negative value can designate motion in the counterclockwise direction.

An incremental move type can be defined by different behavior. In contrast to the absolute move type, the primary axes can move along a circular path to a new position, which can be defined by the sum of a position array and an old position. The ancillary axes can move directly to the new position, which can be defined by the sum of the position array and the old position. For rotary axes, a positive value can indicate that the position should be moved in the clockwise direction, whereas a negative value can indicate the position should be moved in the counterclockwise direction.

The position operand 408 defines the location of the either the new absolute or incremental position, as discussed above, that can be dependent on the value of the move type operand 406 (e.g., absolute or incremental). The position is a one-dimensional array whose dimension is defined to be at least the equivalent of the number of axes in the coordinate system. As noted above, the coordinate system operand 402 can be utilized to designate the number of axes employed with the MCCM instruction 400.

The circle type operand 410 can specify how the via/center/radius (VCR) operand 412 (discussed below) defines a circle. A plurality of different circle types can be employed to define a circle including via, center, radius and center incremental, for example. The circle type "via" can utilize the VCR to define an array indicative of a position along a circle. The circle type "center" can utilize the VCR to define an array indicative of the center of a circle. The circle type "radius" can employ the VCR to define a single value indicating the radius of a circle. The circle type "center incremental" can define an array incrementally indicating the center of a circle.

The via/center/radius operand 412 can define the absolute or incremental value of a position along a circle, the center of a circle or the radius of a circle dependent upon the value of the move type operand 406 and the circle type operand 410. If the circle type is via, center or center incremental, the VCR position operand is a one-dimensional array, whose dimension is defined to be at least the equivalent of the number of axes specified in the coordinate system. If the circle type is radius, the VCR position operand is a single value. Below is a table of exemplary circle and move types and their corresponding behavior.

| Move Type | Circle Type | Behavior |
| --- | --- | --- |
| Absolute | Via | The via/center/radius position array can define a position along the circle. |
| Incremental | Via | The sum of the via/center/radius position array and the old position can define a position along the circle. |
| Absolute | Center | The via/center/radius position array can define the center of the circle. |
| Incremental | Center | The sum of the via/center/radius position array and the old position can define the center of the circle. |
| Not Applicable | Radius | The via/center/radius position single value can define the arc radius. The sign of the value is used to determine the center point to distinguish between the two possible arcs. A positive value indicates a center point that will generate an arc less than 180 degrees. A negative value indicates a center point that will generate an arc greater than 180 degrees. This format is only valid for two-dimensional circles. |
| Absolute | Center Incremental | The sum of the via/center/radius position array and the old position can define the center position of the circle. |
| Incremental | Center Incremental | The sum of the via/center/radius position array and the old position can define the center position of the circle. |

The direction operand 414, can be employed to define the rotational direction of the circular move, either clockwise or counterclockwise, according to the right handed screw rule. The direction operand 414 can also indicate if the circular move defines a full circle. The speed operand 416, accel rate operand 420 and the decel rate operand 424 can define the maximum speed, acceleration and deceleration along the path of the coordinated move. The speed units operand 418, accel units operand 422 and the decel units operand 426 can define the units that are applied to the values of the speed 416, accel rate 420 and decel rate 424 operands. Such unit designation can occur either directly in the coordination units of the specified coordinate system, or as a percentage of the maximum values defined in the specific coordinate system in coordinate units. The velocity profile operand 428 can define whether the coordinated move follows a trapezoidal or S-curve profile.

The termination type operand 430 can define the method by which the MCCM instruction blends its path into to a possible subsequent instruction (e.g., MCCM, MCLM, etc.) An "Actual Tolerance" termination type can terminate the MCCM instruction when the vector position lag for the primary axes and the position lag for each ancillary axis is less than the actual tolerance. The position lag can be the actual position minus the commanded position and can be computed after the entire circular move has been interpolated, for example, when the distance to go equals zero. A possible following MCLM or MCCM instruction can then begin. A "No Settle" termination type can terminate the MCCM instruction when the entire circular move has been interpolated (arc length distance-to-go=0). A MCLM or MCCM instruction can then begin. A "Command Tolerance" termination type can terminate the MCCM instruction when the arc length distance-to-go for the primary axes and the distance-to-go for each ancillary axis is less than the command tolerance. The distance-to-go for primary axes is the distance along the circular arc from the programmed endpoint to the commanded position. The distance-to-go for ancillary axes is the distance from the programmed endpoint to the commanded position. A MCLM or MCCM instruction can then begin. If there is no following MCLM or MCCM instruction, the move will degenerate to a "No Settle" termination type. A "No Decel" termination type can terminate the MCCM instruction when the circular move has been interpolated up to the deceleration point. The deceleration point of the move is dependent on the profile chosen (trapezoidal or S-curve). A MCLM or MCCM instruction can then begin. If there is no following MCLM or MCCM instruction, the move will degenerate to a "No Settle" termination type. A "Contour with Velocity Constrained" termination type can terminate the linear move when the entire linear move has been interpolated (e.g., vector distance-to-go=0).

However, the speed at which it transitions to the next move can be
- the specified speed for the current move if the next move speed is higher, or
- the specified speed for the next move if the next move speed is lower, or
- the maximum speed at which the next can be started if the next move is short.

A "Contour with Velocity Unconstrained" termination type can terminate the linear move when the entire linear move has been interpolated (e.g., vector distance-to-go=0). However, the speed at which it transitions to the next move can be
- the specified speed for the current move if the next move speed is higher, or
- the specified speed for the next move if the next move speed is lower.

The merge operand 432 can define the whether the motion of all specified axes is turned into a pure coordinated move. If the merge operand is enabled, the merge speed operand 434 can define whether the current speed or the programmed speed is utilized as the maximum speed along the path of a coordinated move. A "Disabled" merge will not affect the currently executing single axis motion instructions involving any axes defined in the specified coordinate system. Also, any coordinated motion instructions involving the same specified coordinate system will not be affected by the activation of this instruction, and its termination type can affect this instruction. A "Coordinate Motion" merge can terminate any currently executing coordinated motion instructions involving the same specified coordinate system, and the prior motion can be merged into the current move at the speed defined in the merge speed operand 434. Also, substantially all pending coordinated motion instructions can be cancelled. Any currently executing system single axis motion instructions involving any axes defined in the specified coordinate system will not be affected by the activation of this instruction, and can result in superimposed motion on the affected axes. An "All Motion" merge can terminate any currently executing single axis motion instructions involving any axes defined in the specified coordinate system, and any currently executing coordinated motion instructions involving the same specified coordinate system. The prior motion can be merged into the current move at the speed defined in the merge speed parameter. Also, any pending coordinated motion instructions can be cancelled.

Figures 5A, 5B:
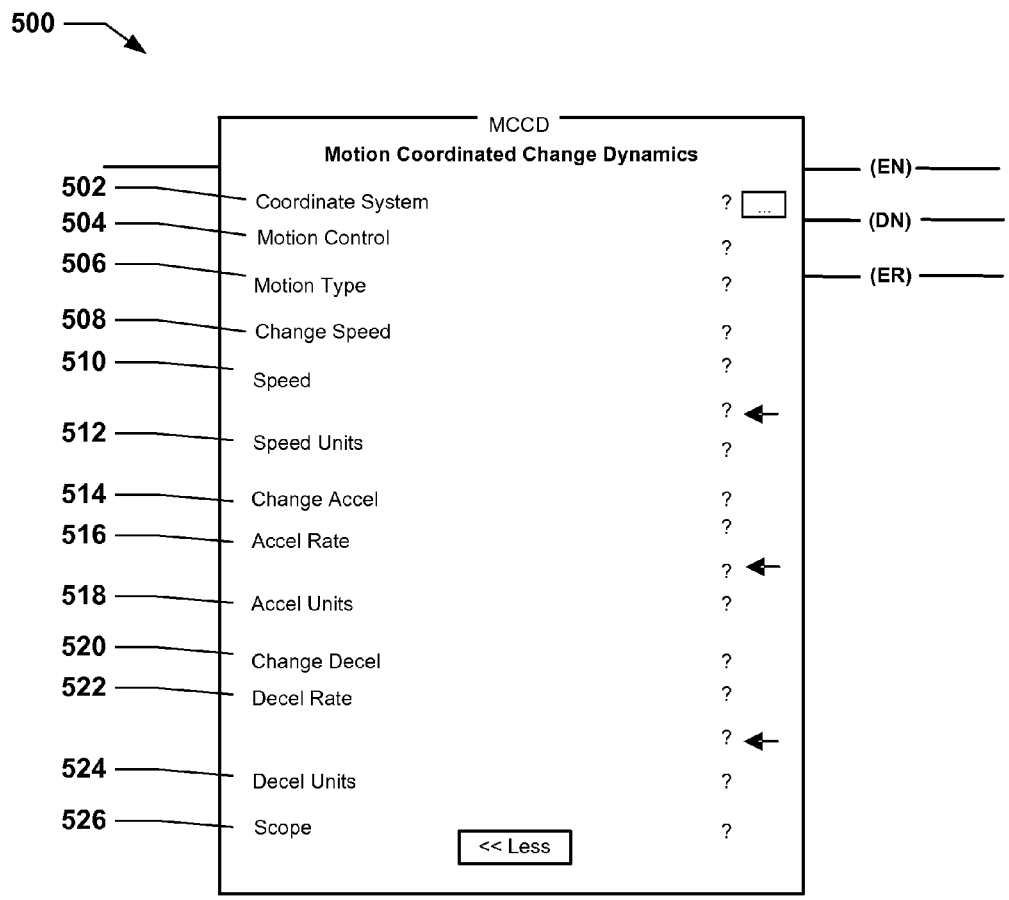
FIG. 5 illustrates an exemplary instruction faceplate, in accordance with an aspect of the current invention.

Referring now to FIGS. 5A and 5B, the Motion Coordinated Changed Dynamics (MCCD) instruction will now be described. The MCCD instruction 500 initiates a change in path dynamics for the motion active on the specified coordinate system. Based on the specified motion type, the MCCD instruction changes the coordinated move or jog motion profile currently active in the system. The MCCD instruction 500 as it appears to the programmer shows an exemplary faceplate that can be utilized in a ladder logic (FIG. 5A) or structured text (FIG. 5B) programming languages, for example. The MCCD instruction 500 has the following operands: a coordinate system operand 502, a motion control operand 504, a motion type operand 506, a change speed operand 508, a speed operand 510, a speed units 512 operand, a change accel operand 514, an accel rate operand 516, an accel units operand 518, a change decel operand 520, a decel rate operand 522, a decel units operand 524 and a scope operand 526. As described below, the operands 502-526 are employed to allow modifications of various parameters that configure the path dynamics of a specified coordinate system initiated by implementation of the coordinated change dynamics instruction 500. Such operands are described in greater detail below.

The coordinate system operand 502 specifies the system of motion axes that define a coordinate system which can include any number of axes. The motion control operand 504 stores status information during execution of the MCCD instruction. This information includes whether execution is in process, error information, etc. The motion control operand 504 can be employed by various control systems and/or processes to monitor the status of the MCCD instruction. For example, such information can designate the completion of an aspect of the MCCD instruction which can be utilized to initiate a disparate method or process. A listing of exemplary control bits and error codes is given below.

| Operands | |
|---|---|
| Operand | Description |
| Coordinate System | coordinated group of axes |
| Motion control | structure used to access instruction status parameters |
| Motion type | 1 = Coordinated Move |
|  | 0 = Coordinated Jog |
| Position | [coordination units] |
| Change Speed | 0 = No |
|  | 1 = Yes |
| Speed | [coordination units] |
| Speed units | 0 = Units per second |
|  | 1 = % of maximum |
| Change Accel | 0 = No |
|  | 1 = Yes |
| Accel rate | [coordination units] |
| Accel units | the units for the acceleration field |
|  | 0 = units per sect |
|  | 1 = % of maximum |
| Change Decel | 0 = No |
|  | 1 = Yes |
| Decel rate | [coordination units] |
| Decel units | the units for the deceleration field |
|  | 0 = units per sec$^2$ |
|  | 1 = % of maximum |
| Scope | 0 = Active Motion |
|  | 1 = Pending Motion |
|  | 2 = Active and Pending Motion |

The MCCD instruction sets the following error codes in the Motion Instruction when an error occurs.

Error Codes

| Name | Description |
|---|---|
| Servo Off State | The servo loop of at least one of the axes is not closed. |
| Shutdown State | At least one of the axes can be in the shutdown state. |
| Illegal Axis Type | At least one of the axes may not be configured as a servo or virtual axis. |
| Axis Not Configured | At least one of the axes may not be configured. |
| Parameter Out of Range | The value of at least one parameter can be outside the legal range limit: |
|  | 1. The motion type can be less than 0 or greater than 1. (Extended Error = 2) |
|  | 2. The speed can be less than 0. (Extended Error = 4) |
|  | 3. The accel rate can be less than or equal to 0. (Extended Error = 7) |
|  | 4. The decel rate can be less than or equal to 0. (Extended Error = 10) |

-continued

| Name | Description |
|---|---|
| Homing in Process Error | At least one of the axes can be executing a homing sequence. |
| Motion Group Not Synchronized | The motion group associated with the axes may not be synchronized. |
| Illegal Dynamic Change | There may be no coordinated motion active. |
| Illegal Controller Mode | The current operating mode of the controller may not support the instruction. |
| Illegal Axis Data Type | At least one of the axes may not be configured as an axis data type that can accept a command. |
| Coordinate System Not Configured | The coordinate system may be not configured. |

The motion type operand 506 specifies which motion profile to change. For example, a coordinated jog motion type can change the dynamics of the active coordinated jog for the specified coordinate system. In addition, a coordinated move motion type can change the dynamics of the active coordinated move for the specified coordinate system. It is to be appreciated that various other motion profiles can be defined and implemented in association with the motion type operand 506.

The change speed operand 508, the change accel operand 514 and the change decel operand 520 can specify changes to the associated parameters of the coordinated motion profile. The speed operand 510, the accel rate operand 516 and the decel rate operand 522 can define the maximum speed, acceleration and deceleration along the path of the coordinated motion. The speed units operand 512, the accel units operand 518 and the decel units operand 524 define the units that are applied to the values of the speed, accel rate and decel rate. Such unit designation can occur either directly in the coordination units of the specified coordinate system, or as a percentage of the maximum values defined in the specific coordinate system in coordinate units.

Figures 6A, 6B:
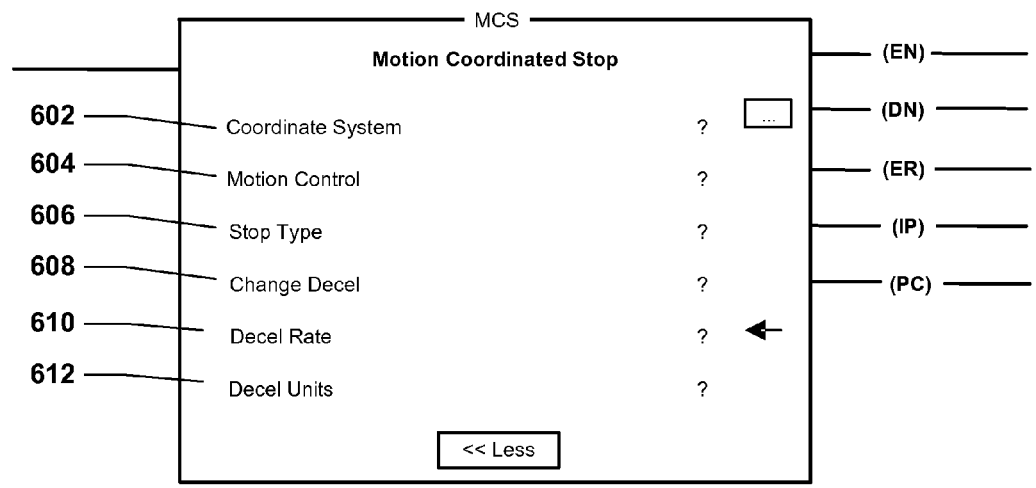
FIG. 6 illustrates an exemplary instruction faceplate, in accordance with an aspect of the current invention.

Referring now to FIGS. 6A and 6B, the Motion Coordinated Stop (MCS) instruction 600 will now be described. The MCS instruction 600 initiates a controlled stop of a specified motion profile operative on a specified system. Based on the specified motion type, the MCS instruction stops either all motion profiles or only a specified motion profile of a specified coordinated system. Any pending motion profile can also be aborted. The MCS instruction 600 as it appears to the user shows an exemplary faceplate that can be employed in various programming languages including ladder logic (FIG. 6A) or structured text (FIG. 6B), for example. The MCS instruction 600 has the following operands: a coordinate system operand 602, a motion control operand 604, a stop type operand 606, a change decel operand 608, a decel rate operand 610 and a decel units operand 612. As described below, the operands 602-612 are employed to allow modifications of various parameters that can initiate a controlled stop of a particular motion profile associated with a specified coordinate system. These operands are described in greater detail below.

The coordinate system operand 602 can designate the system of motion axes employed to define a coordinate system, for example. The motion control operand 604 stores status information during execution of the MCS instruction 600. This information includes whether execution is in process, error information, etc. The motion control operand 604 can be employed by various control systems and/or processes to monitor the status of the MCS instruction 600. For example, such information can designate the completion of an aspect of the MCS instruction 600 which can be utilized to initiate a disparate method or process. A listing of exemplary control bits and error codes is given below.

| Operands | |
|---|---|
| Operand | Description |
| Coordinate System | coordinated group of axes |
| Motion control | structure used to access instruction status parameters |
| Stop type | Specifies the motion profile to stop:<br>0 = All Motion<br>1 = Coordinated Jog<br>2 = Coordinated Move |
| Change Decel | 0 = No<br>1 = Yes |
| Decel rate | [coordination units] |
| Decel units | the units for the deceleration field<br>0 = units per sec$^2$<br>1 = % of maximum |

The MCS instruction sets the following error codes in the Motion Instruction when an error occurs.

Error Codes

| Name | Description |
|---|---|
| Servo Off State | The servo loop of at least one of the axes is not closed. |
| Shutdown State | At least one of the axes can be in the shutdown state. |
| Illegal Axis Type | At least one of the axes may not be configured as a servo or virtual axis. |
| Axis Not Configured | At least one of the axes may not be configured. |
| Parameter Out of Range | The value of at least one parameter can be outside the legal range limit:<br>1. The decel rate can be less than or equal to 0. (Extended Error = 4) |
| Motion Group Not Synchronized | The motion group associated with the axes may not be synchronized. |
| Illegal Controller Mode | The current operating mode of the controller may not support the instruction. |
| Illegal Axis Data Type | At least one of the axes may not be configured as an axis data type that can accept a command. |
| Coordinate System Not Configured | The coordinate system may not be configured. |

The stop type operand 606 can define which motion profile to stop. An "All" motion type can be utilized to stop all the motion profiles of a particular coordinate system. Any currently executing coordinated motion instructions involving the same particular coordinate system can be stopped, along with all currently executing coordinated and single axis instructions defined in the particular coordinate system. A "Coordinated Jog" motion type can be employed to stop all jog profiles of a specified coordinate system. A "Coordinated Move" motion type can be employed to stop all move profiles of a specified coordinate system.

The change decel operand 608 can specify whether to change the decel rate of the coordinated motion profile. The decel rate operand 610 can define the maximum deceleration along the path of coordinated motion. The decel units operand 612 can define the units applied to the value of the decel rate either directly in the coordination units of a specified coordinate system or as a percentage of the maximum values defined in a specified coordinate system in coordination units.

Figures 7A, 7B:
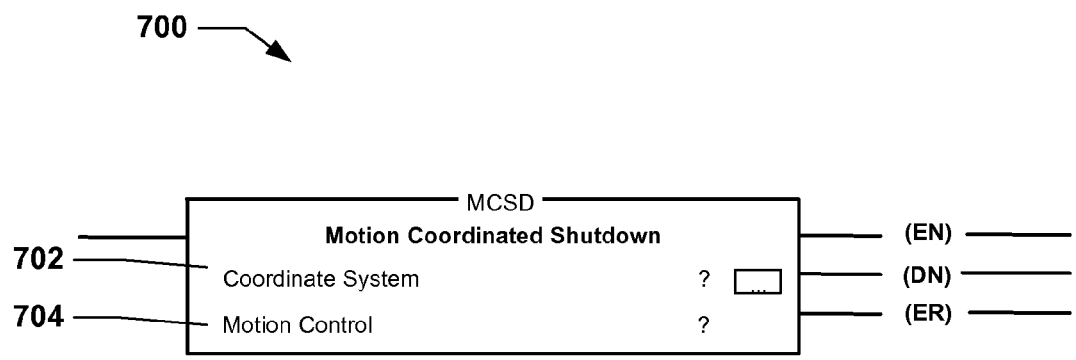
FIG. 7 illustrates an exemplary instruction faceplate, in accordance with an aspect of the current invention.

Referring now to FIGS. 7A and 7B, the Motion Coordinated Shutdown (MCSD) instruction 700 can initiate a controlled shutdown of all of the axes of the specified coordinate system. The MCSD instruction 700 as it appears to the user shows an exemplary faceplate that can be employed in various programming languages including ladder logic (FIG. 7A) or structured text (FIG. 7B), for example. The MCSD instruction 700 can utilize the following operands: a coordinate system operand 702 and a motion control operand 704. As described below, such operands can be utilized to allow modifications of various parameters that can initiate a controlled shutdown of axes associated with a particular coordinate system. These operands are described in greater detail below.

The coordinate system operand 702 can specify the system of motion axes that define a coordinate system (e.g., Cartesian). The motion control operand 704 can be employed to stores status information during execution of the MCSD instruction 700. This information includes whether execution is in process, error information and can be utilized by various control systems and/or processes to monitor the status of the MCSD instruction 700. For example, such information can designate the start and/or completion of a function of the MCSD instruction 700 which can be employed to initiate a process elsewhere in control architecture. A listing of exemplary control bits and error codes is given below.

| Operands | |
|---|---|
| Operand | Description |
| Coordinate System | coordinated group of axes |
| Motion control | structure used to access instruction status parameters |

The MCSD instruction affects the following control bits of the Motion Instruction.
Error Codes

| Name | Description |
|---|---|
| Execution Collision | The instruction tried to execute while another instance of this instruction was executing. |
| Axis Not Configured | At least one of the axes is not configured. |
| Servo Module Failure | Messaging to the servo module failed. |
| Motion Group Not Synchronized | The motion group associated with the axes is not synchronized. |
| Shutdown Status Timeout | The MCSD instruction failed to detect the assertion of the ShutdownStatus bit within a fixed delay time period on an axis that it targeted with a shutdown. |
| Coordinate System Not Configured | The coordinate system may not be configured. |

Figures 8A, 8B:
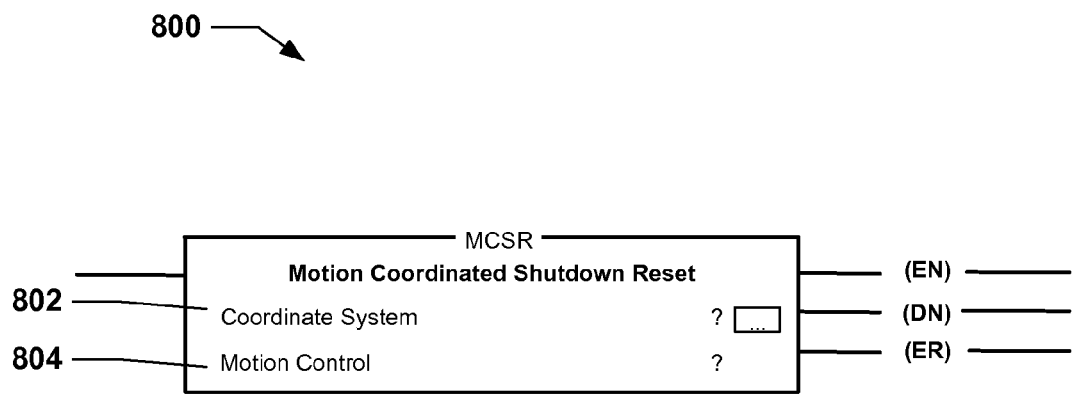
FIG. 8 illustrates an exemplary instruction faceplate, in accordance with an aspect of the current invention.

Referring now to FIGS. 8A and 8B, the Motion Coordinated Shutdown Reset (MCSR) 800 can initiate a reset of a specified coordinate system from the shutdown state to the axis ready state and clears the axis faults. The MCSR instruction 800 as it appears to a user shows an exemplary faceplate that can be employed in various programming languages including ladder logic (FIG. 8A) or structured text (FIG. 8B), for example. The MCSR instruction 800 can have the following operands: a coordinate system operand 802 and a motion control operand 804. As described below, such operands can be utilized to provide changes to various parameters that can initiate a reset of all the axes of the specified coordinate system from the shutdown state to the axis ready state and can clear the axis faults. These operands are described in greater detail below.

The coordinate system operand 802 can specify the system of motion axes that define a coordinate system (e.g., Cartesian). The motion control operand 804 can be employed to stores status information during execution of the MCSR instruction 800. This information includes whether execution is in process, error information and can be utilized by various control systems and/or processes to monitor the status of the MCSR instruction 800. For example, such information can designate the start and/or completion of a function of the MCSR instruction 800 which can be employed to begin and/or terminate a process in a disparate control system. A listing of exemplary control bits and error codes is given below.

| Operands | |
|---|---|
| Operand | Description |
| Coordinate System | coordinated group of axes |
| Motion control | structure used to access instruction status parameters |

In addition, the MCSR instruction sets the following error codes in the Motion Instruction when an error occurs.

The MCSD instruction sets the following error codes in the Motion Instruction when an error occurs.
Error Codes

| Name | Description |
|---|---|
| Execution Collision | The instruction tried to execute while another instance of this instruction was executing. |
| Axis Not Configured | At least one of the axes may not be configured. |
| Servo Module Failure | Messaging to the servo module failed. |
| Motion Group Not Synchronized | The motion group associated with the axes is not synchronized. |
| Coordinate System Not Configured | The coordinate system may not be configured. |

Figure 9:
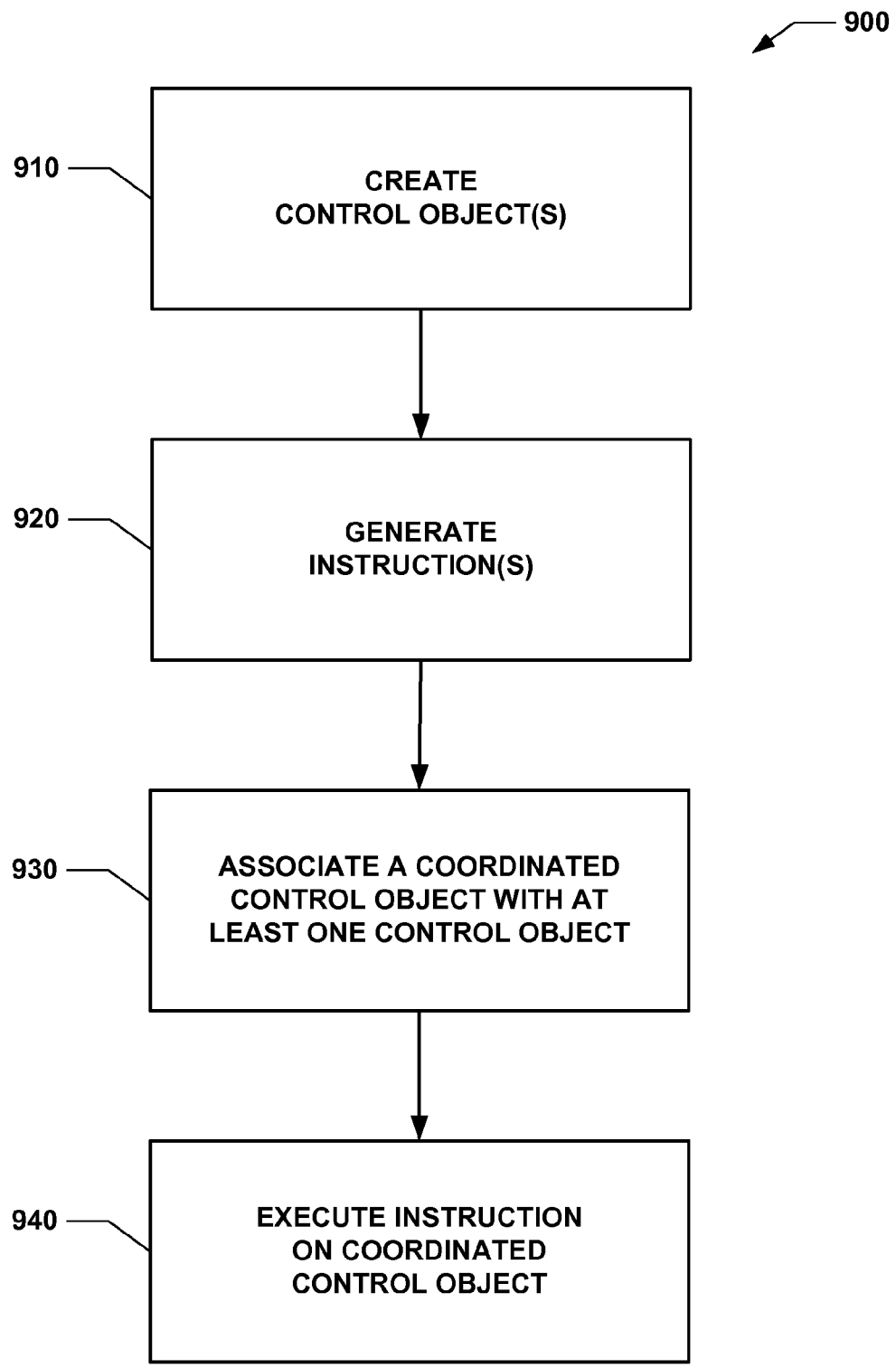
FIG. 9 shows an exemplary methodology, in accordance with an aspect of the current invention.
Figure 10:
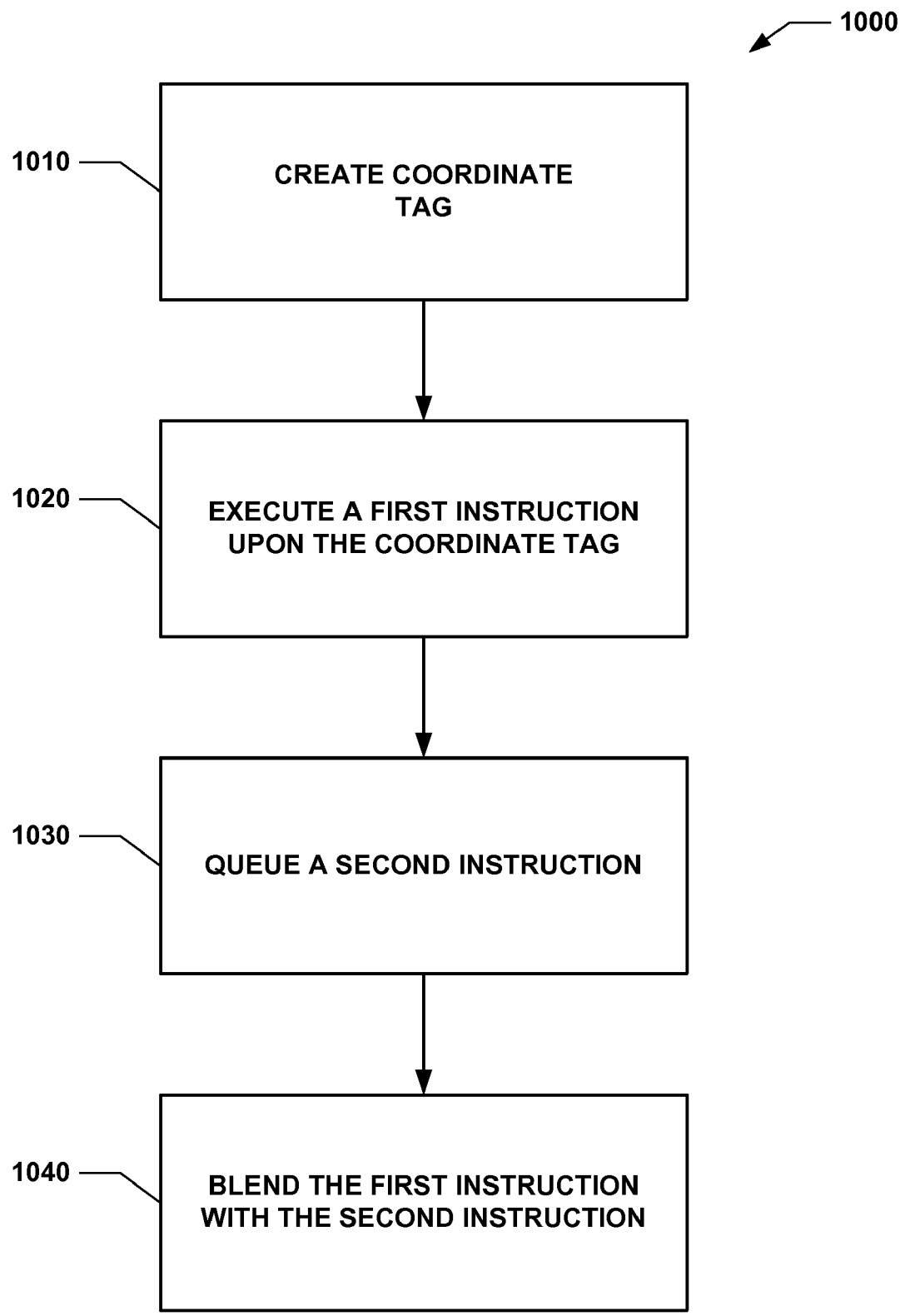
FIG. 10 shows an exemplary methodology, in accordance with an aspect of the current invention.

FIGS. 9 and 10 illustrate methodologies 900 and 1000 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 9 illustrates a methodology 900 employed to execute an instruction on a coordinated control object. At 910, a coordinated control object(s) can be created and the control object(s) can be representative of a component and/or device related to the control of a system and/or process. Once connectivity is established, control information can be gathered and provided as a means to change desired inputs and/or outputs relating to the component and/or device. In addition, a plurality of objects can be associated with a single object such that by implementing such a control object(s), control information can be aggregated and controlled. Thus, a single control object can have instructions executed thereon which in turn can control a plurality of objects.

At 920, an instruction(s) can be generated. Such an instruction(s) can be generated by a user, based on a condition, etc. and can consist of inputs and/or outputs to facilitate communication between the instruction and the control object(s) it can execute upon. The instruction(s) can be employed in various environments (e.g., software, hardware, . . . ) to provide desired connectivity to the hardware and/or software components represented by the control objects. At 930, each instruction can be related to any number of parameters associated with the control objects created at 910. At 940, the instruction(s) is executed on the coordinate control. A memory and/or processor can be associated with generation of the instruction to facilitate the execution of instruction(s) created.

Referring now to FIG. 10, which shows a methodology 1000 for utilizing a plurality of instructions to execute on a coordinate tag. At 1010, a coordinate tag can be created as described above. Such a coordinated tag can represent one or more axes (e.g., X, Y, Z, . . . ) and expose various parameters associated with each axis such as speed, acceleration, etc. The coordinate tag can be employed within a management application to allow a user to view, organize and modify one or more coordinate tags.

At 1020, a first instruction can be employed to execute upon the coordinate tag(s) created at 1010. The instruction can be employed to modify motion of axis values exposed by the coordinated tag. For example, instructions can be employed to set appropriate values to facilitate motion in a circle or to execute a series of controlled moves. In order to allow for smooth transition between different stages of motion, at 1030 a second instruction can be queued to provide subsequent instructions to the coordinate tag without delay. In this manner, delay associated with processing time can be mitigated and allow for a plurality of instructions to execute upon a coordinate tag in a seamless manner. It is to be appreciated that although one instruction is queued in this approach, any number of instructions can be queued.

At 1040, the first instruction (e.g., active) is blended with a second instruction (e.g., pending) to allow one move to be blended into another. To facilitate a smooth transition, a virtual coordinate system based on the second move's geometry can be created. Substantially all remaining and pending moves (e.g., queued instructions) can be set up in terms of that coordinate frame. Any number of methods can be employed to blend two instructions such as enhanced blending, tangential normal binormal and the like. The transition between moves can be determined so that a blend can begin at substantially any point as desired.

Figure 11:
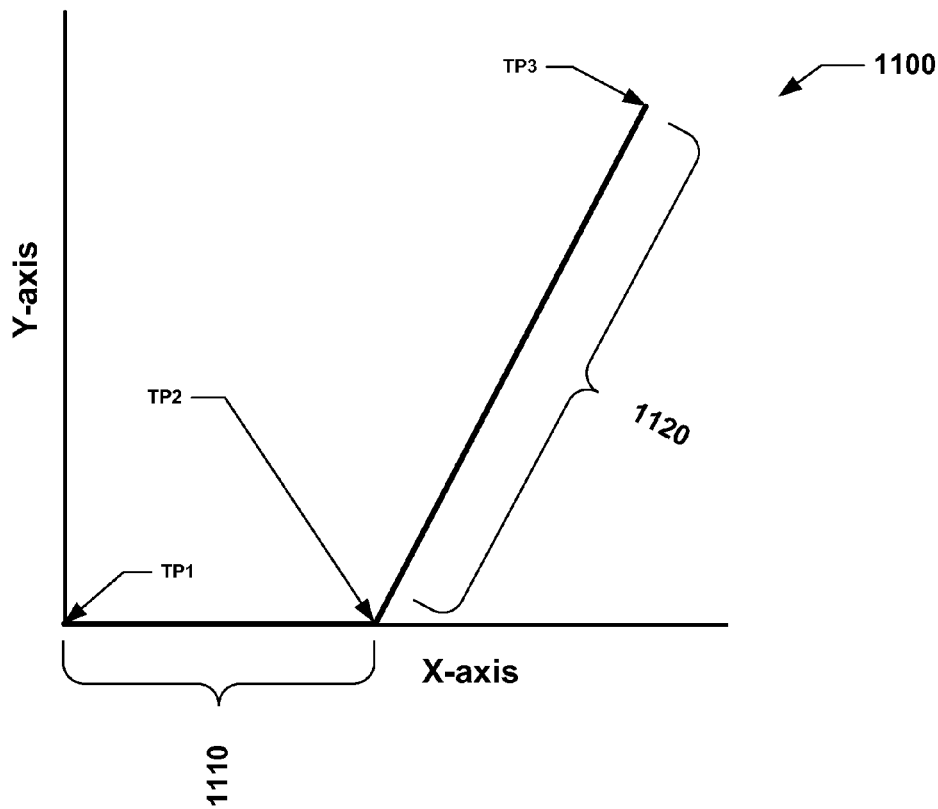
FIG. 11 shows an exemplary motion diagram, in accordance with an aspect of the current invention.
Figure 12:
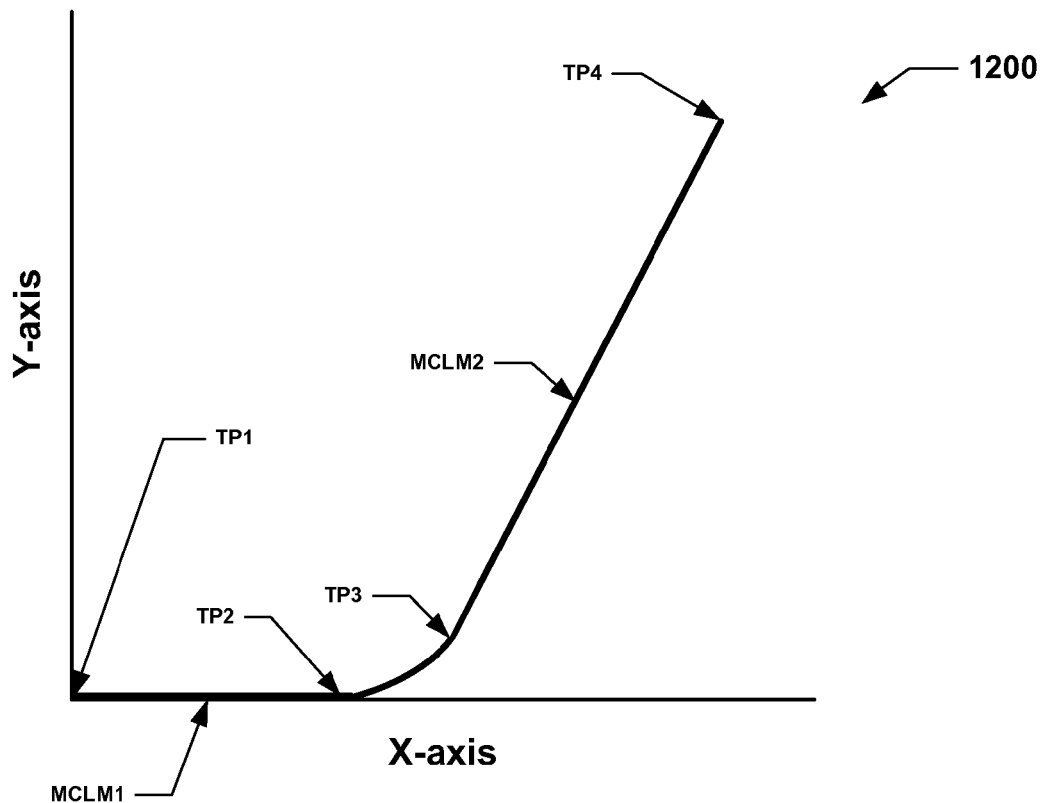
FIG. 12 shows an exemplary motion diagram, in accordance with an aspect of the current invention.

FIGS. 11-12 illustrate possible ways that two instructions can be executed successively to facilitate motion control (e.g., a move). The Termination Type operand for a first instruction (e.g., MCLM or MCCM) specifies how the currently-executing move gets terminated. FIGS. 11 and 12 show the states of instruction bits and coordinate system bits that get affected at various transition points. In particular, FIG. 11 illustrates the termination types Actual Tolerance or No Settle and FIG. 12 illustrates the termination types Command Tolerance or No Decel further described below.

Controlling a series of moves can employ a plurality of instructions and these instructions can be executed utilizing a variety of termination types that can dictate how a first instruction ends (e.g., stops executing) and second instruction begins (e.g., starts executing). In addition, such termination types can determine how a first instruction (e.g., MCLM or MCCM) blends its path into a succeeding instruction (e.g., MCLM or MCCM). Various termination types can be employed such as Actual Tolerance, No Settle, Command Tolerance, No Decel and the like.

FIG. 11 shows two instruction sets MCLM1 and MCLM2 wherein MCLM2 is executed after MCLM1. In this example, three transition points TP1, TP2 and TP3 are shown that distinguish between moves in a motion control system. The transition point TP2 is representative of the time that the first instruction MCLM1 completes execution and MCLM2 begins execution. A termination type such as actual tolerance or no settle can provide a non-blended transition between moves MCLM1 and MCLM2.

FIG. 12 illustrates a blended move wherein two instructions MCLM1 and MCLM2 are employed in succession to provide motion. Transition points TP1, TP2, TP3 and TP4 illustrate different times as they relate to moves facilitated by instructions MCLM1 and MCLM2. Between TP1 and TP2, MCLM1 is employed to provide motion. From TP2 to TP3, MCLM1 and MCLM2 are blended to facilitate a smooth transition between move instructions. From TP3 to TP4, MCLM2 is utilized to provide motion until the motion reaches substantially the same location as if MCLM2 were executed without blending. Thus, although instructions MCLM1 and MCLM2 are blended, the start and end locations are substantially the same as the MCLM1 and MCLM2 in an unblended environment shown in FIG. 11. A termination type such as "Command Tolerance", "No Decel", "Contour with Velocity Constrained" or "Contour with Velocity Unconstrained" can provide blended transitions between moves MCLM1 and MCLM2.

FIGS. 13-18 provide illustrations of various instructions employed to provide motion control. In particular, FIG. 13 relates to an MCLM instruction and FIGS. 14-18 relate to various implementations of the MCCM instruction. It is to be appreciated that moves can be executed on substantially any number of axes in various combinations. In addition, although linear coordinate systems are employed in the following examples, substantially any coordinate system such as rotary, cylindrical, etc. can be employed.

Figure 13:
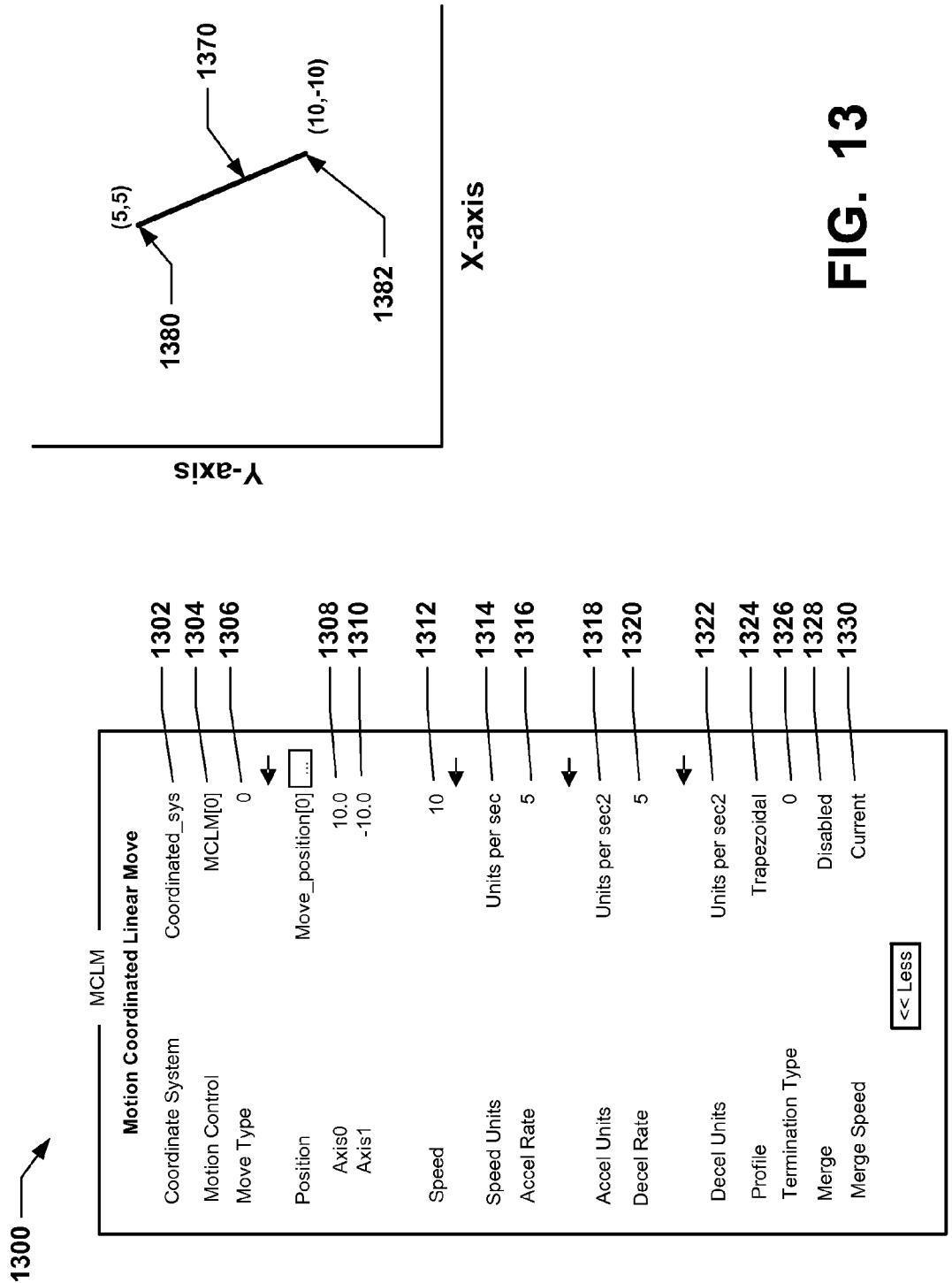
FIG. 13 shows an exemplary motion diagram, in accordance with an aspect of the current invention.

Turning now to FIG. 13, which shows an MCLM instruction 1300 with operands to facilitate motion in a linear axis (e.g., line) from a first point 1380 to a second point 1382. In this example, motion begins at the first point 1380 located at (5,5) and ends at the second point 1382 located at (10,−10) in a 2-dimensional space wherein the dimensions are orthogonal to each other. The operands associated with the MCLM can be varied to accommodate various desired linear moves. In this example the operands have the following values. The Coordinate System is "Coordinated_sys" 1302, the Motion Control is "MCLM[0]" 1304, the Move Type is "0" 1306. A "0" value for the operand Move Type indicates an absolute move type wherein the axes move via linear path to the position array at the Speed, Accel Rate and Decel Rate as specified by the operands. Axis0 is "10.0" 1308 and Axis1 is "−10.0" 1310 to specify a stop location of (10.0,−10.0). The Speed is "10" 1312 and the Speed Units are given in "units per sec" 1314. The Accel Rate is "5" 1316 and the Accel Units are "units per sec2" 1318. The Decel Rate is "5" 1320 and the Decel Units are "units per sec2" 1322. The Profile is "Trapezoidal" 1324 which refers to the shape of the velocity profile versus time. The "Trapezoidal" velocity profile can provide flexibility in programming subsequent motion and can provide fast acceleration and deceleration times. The Termination Type is "0" 1326 which indicates an Actual Tolerance termination type. The Merge is "Disabled" 1328 and the Merge Speed is the "Current" 1330 axis speed. Thus, as a result of executing the MCLM instruction 1300 in association with a two dimensional orthogonal space, the move 1370 results therefrom.

The total distance traveled along the path of the vector is:

$D_{Axis0} = 10 - 5 = 5$ $D_{Axis1} = -10 - 5 = -15$

Total Dist = $\sqrt{(D_{Axis0})^2 + (D_{Axis1})^2} = 15.811388$

The vector speed of the selected axes is equal to the specified speed in the position units per second. The speed of each axis is proportional to the distance traveled by the axis, divided by the square root of the sum of the squares of the distance moved by all axes. The actual speed of Axis0 is the following percent of the vector speed of the move:

% Axis0 Speed = $|D_{Axis0}/\text{TotalDist}| = |5/15.811388| = 0.3162 = 31.62\%$ % Axis1 Speed = $|D_{Axis0}/\text{TotalDist}| = |-15/15.811388| = 0.9487 = 94.87\%$ Thus, Axis0 Speed = 0.3162*10.0 = 3.162 units/sec.

Axis1 Speed = 0.9487*10.0 = 9.487 units/sec.

The acceleration and deceleration for each axis is the same percentage as speed.

Figure 14:
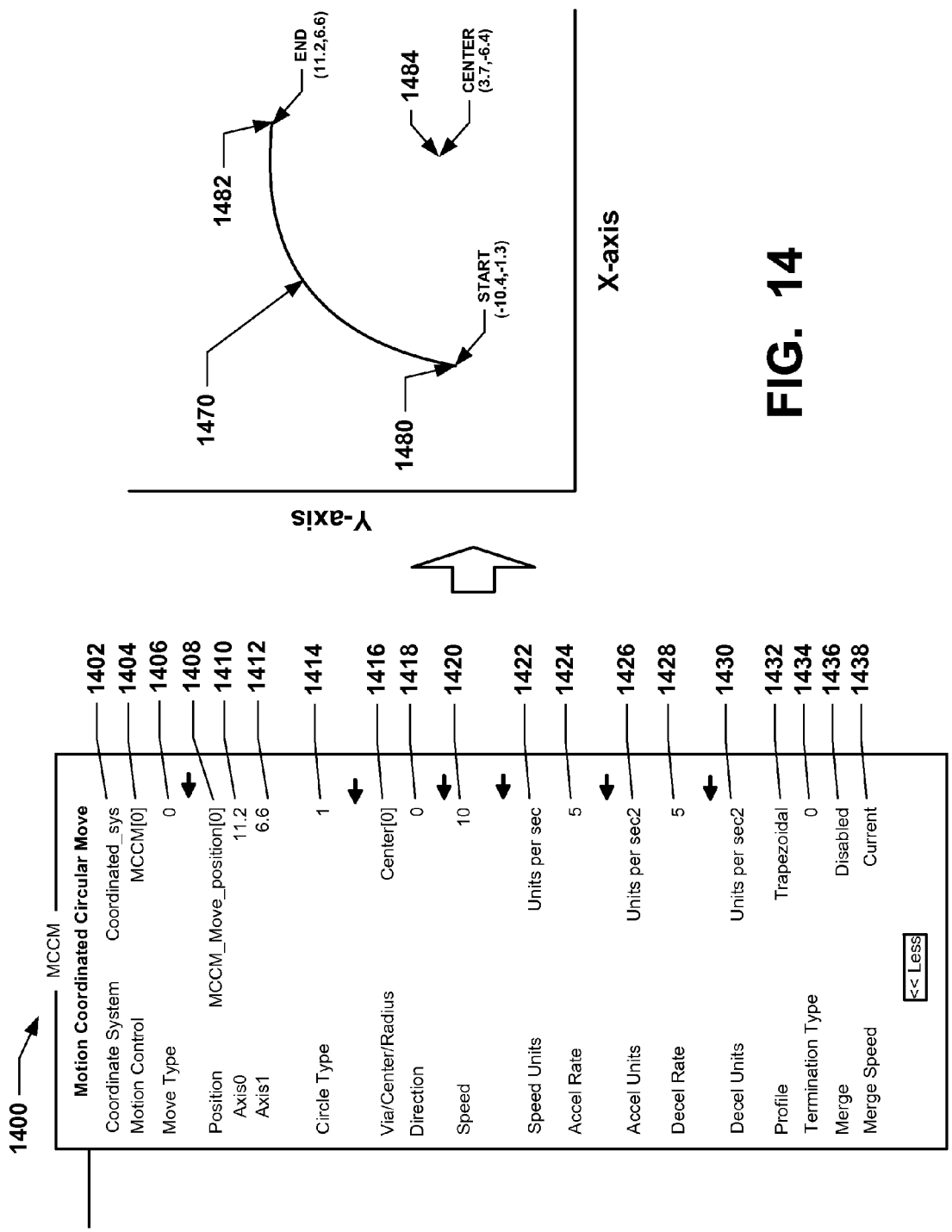
FIG. 14 shows an exemplary motion diagram, in accordance with an aspect of the current invention.

Turning now to FIG. 14, which shows an MCCM instruction 1400 with operands to facilitate motion in a circle from a first point 1480 to a second point 1482. In this example, a circle is defined by a first point 1480 (e.g., start), a second point 1482 (e.g., end) and a center point 1484. Motion begins at the first point 1480 located at (−10.4,−1.3) and ends at the second point 1482 located at (11.2,6.6) with a center point 1484 located at (3.7,−6.4) in a 2-dimensional space wherein the dimensions are orthogonal to each other. The operands associated with the MCCM can be varied to accommodate various desired circular moves. In this example the operands are set to provide circular motion utilizing a center circle type and have the following values. The Coordinate System is "Coordinated_sys" 1402, the Motion Control is "MCCM[0]" 1404, the Move Type is "0" 1406. A "0" value for the operand Move Type indicates an absolute move type wherein the axes move via circular path to the position array at the Speed, Accel Rate and Decel Rate as specified by the operands. The Position 1408 is defined by Axis0 which is "11.2" 1410 and Axis1 which is "6.6" 1412 to specify an end stop location of (11.2,6.6). The Circle Type is "1" which can specify a center type indicative of array members containing the circle center value. The Via/Center/Radius is "Center[0]" 1416 and the Direction is "0" 1418 which can indicate motion in the clockwise direction. The Speed is "10" 1420 and the Speed Units are given in "units per sec" 1422. The Accel Rate is "5" 1424 and the Accel Units are "units per sec2" 1426. The Decel Rate is "5" 1428 and the Decel Units are "units per sec2" 1430. The Profile is "Trapezoidal" 1432 which refers to the shape of the velocity profile versus time. The "Trapezoidal" velocity profile can provide flexibility in programming subsequent motion and can provide fast acceleration and deceleration times. The Termination Type is "0" 1434 which indicates an Actual Tolerance termination type. The Merge is "Disabled" 1436 and the Merge Speed is the "Current" 1438 axis speed. Thus, as a result of executing the MCCM instruction 1400 in association with a two dimensional orthogonal space (e.g., Coordinated_sys), the move 1470 results therefrom. The vector speed of the selected axes is equal to the specified speed in the units per second or percent of maximum speed of the coordinate system. Likewise, the vector acceleration or deceleration is equal to the specified acceleration/deceleration in the units per second squared or percent of maximum acceleration of the coordinate system.

Figure 15:
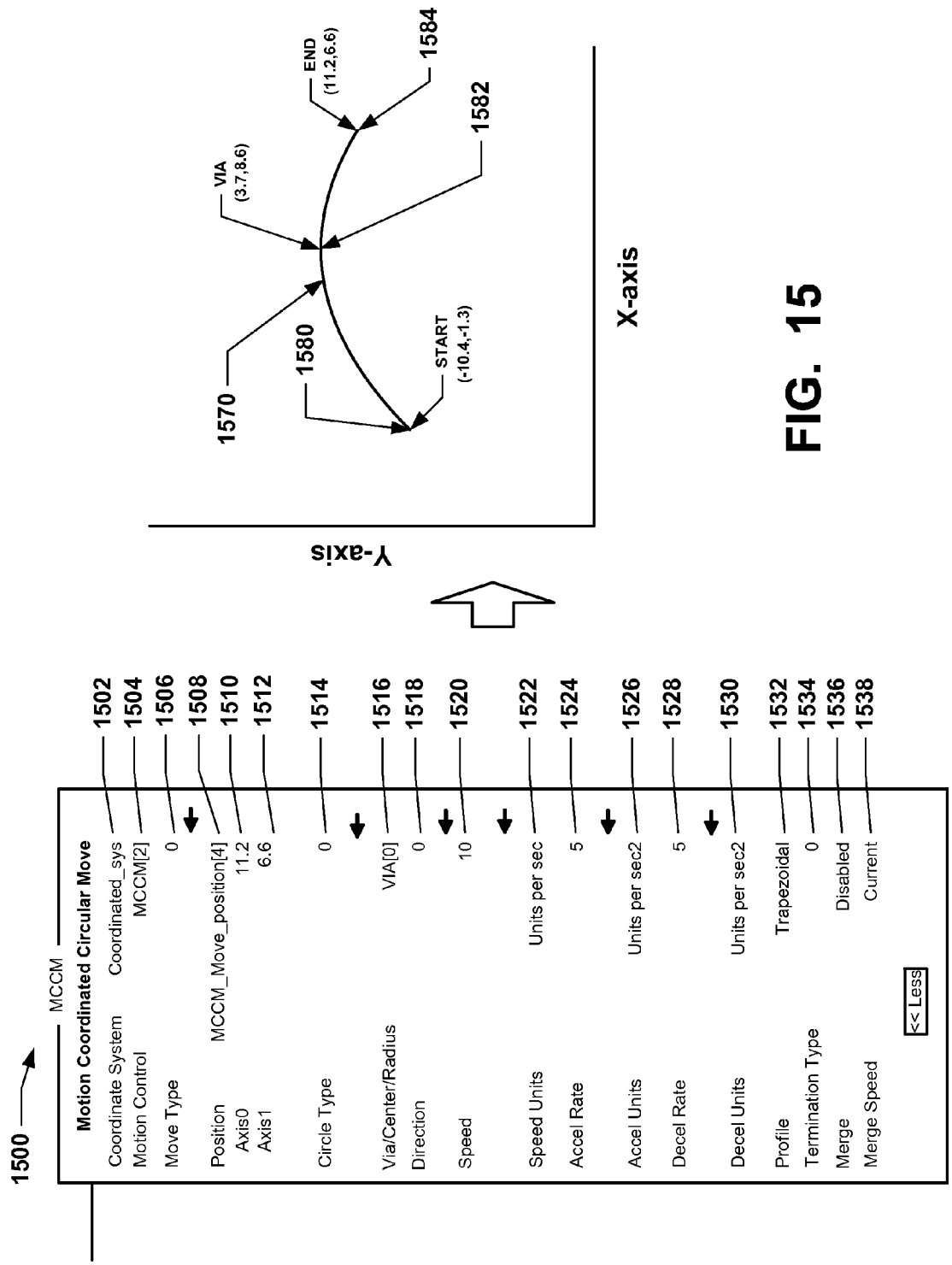
FIG. 15 shows an exemplary motion diagram, in accordance with an aspect of the current invention.

Turning now to FIG. 15, which shows an MCCM instruction 1500 with operands to facilitate motion in a circle from a first point 1580 to a second point 1584. In this example, a circle is defined by a first point 1580 (e.g., start), a second point 1584 (e.g., end) and a via point 1582. Motion begins at the first point 1580 located at (−10.4,−1.3) and ends at the second point 1584 located at (11.2,6.6) with a via point 1582 located at (3.7,8.6) in a 2-dimensional space wherein the dimensions are orthogonal to each other. The operands associated with the MCCM can be varied to accommodate various desired circular moves. In this example the operands are set to provide circular motion utilizing a via circle type and have the following values. The Coordinate System is "Coordinated_sys" 1502, the Motion Control is "MCCM[2]" 1504, the Move Type is "0" 1506. A "0" value for the operand Move Type indicates an absolute move type wherein the axes move via circular path to the position array at the Speed, Accel Rate and Decel Rate as specified by the operands. The Position 1508 is defined by Axis0 which is "11.2" 1510 and Axis1 which is "6.6" 1512 to specify an end stop location of (11.2,6.6). The Circle Type is "0" which can specify a via type indicative of array members containing via point between the start and end points. The Via/Center/Radius is "Via[0]" 1516 and the Direction is "0" 1518 which can indicate motion in the clockwise direction. The Speed is "10" 1520 and the Speed Units are given in "units per sec" 1522. The Accel Rate is "5" 1524 and the Accel Units are "units per sec2" 1526. The Decel Rate is "5" 1528 and the Decel Units are "units per sec2" 1530. The Profile is "Trapezoidal" 1532 which refers to the shape of the velocity profile versus time. The "Trapezoidal" velocity profile can provide flexibility in programming subsequent motion and can provide fast acceleration and deceleration times. The Termination Type is "0" 1534 which indicates an Actual Tolerance termination type. The Merge is "Disabled" 1536 and the Merge Speed is the "Current" 1538 axis speed. Thus, as a result of executing the MCCM instruction 1500 in association with a two dimensional orthogonal space (e.g., Coordinated_sys), the move 1570 results therefrom.

The vector speed of the selected axes is equal to the specified speed in the units per second or percent of maximum speed of the coordinate system. Likewise, the vector acceleration or deceleration is equal to the specified acceleration/deceleration in the units per second squared or percent of maximum acceleration of the coordinate system. This path can be achieved by utilizing an MCCM instruction in the clockwise direction with a Move Type of Absolute or a Move Type of Incremental value.

Figure 16:
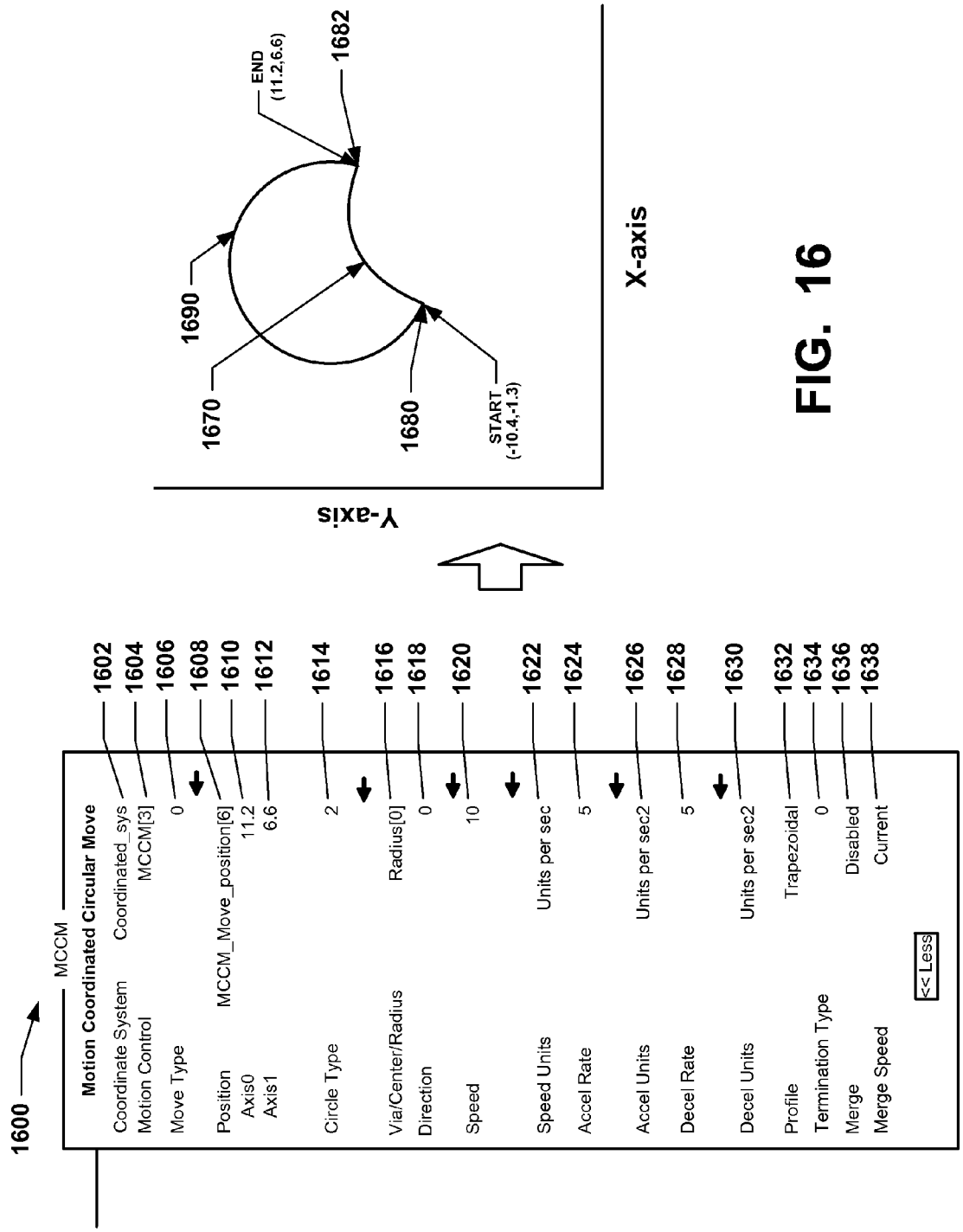
FIG. 16 shows an exemplary motion diagram, in accordance with an aspect of the current invention.

Turning now to FIG. 16, which shows an MCCM instruction 1600 with operands to facilitate motion in a circle from a first point 1680 to a second point 1682. In this example, a circle is defined by a first point 1680 (e.g., start), a second point 1682 (e.g., end) and a desired radius. Motion begins at the first point 1680 located at (−10.4,−1.3) and ends at the second point 1682 located at (11.2,6.6). A radius of a circle is employed to define the move path of the circular motion in a 2-dimensional space wherein the dimensions are orthogonal to each other. The operands associated with the MCCM can be varied to accommodate various desired circular moves. A move can be specified utilizing either a positive or negative radius. A positive radius 1670 creates a shorter (e.g., less than 180 degrees) arc and a negative radius 1690 creates a longer (e.g., greater than 180 degrees) arc.

In this example the operands are set to provide circular motion utilizing a radius circle type and have the following values. The Coordinate System is "Coordinated_sys" 1602, the Motion Control is "MCCM[3]" 1604, the Move Type is "0" 1606. A "0" value for the operand Move Type indicates an absolute move type wherein the axes move via circular path to the position array at the Speed, Accel Rate and Decel Rate as specified by the operands. The Position 1608 is defined by Axis0 which is "11.2" 1610 and Axis1 which is "6.6" 1612 to specify an end stop location of (11.2,6.6). The Circle Type is "2" 1614 which can specify a radius type indicative that array members contain the radius. The Via/Center/Radius is "Radius[0]" 1616 which indicates a radius of 15 units and the Direction is "0" 1618 which can indicate motion in the clockwise direction. The Speed is "10" 1620 and the Speed Units are given in "units per sec" 1622. The Accel Rate is "5" 1624 and the Accel Units are "units per sec2" 1626. The Decel Rate is "5" 1628 and the Decel Units are "units per sec2" 1630. The Profile is "Trapezoidal" 1632 which refers to the shape of the velocity profile versus time. The "Trapezoidal" velocity profile can provide flexibility in programming subsequent motion and can provide fast acceleration and deceleration times. The Termination Type is "0" 1634 which indicates an Actual Tolerance termination type. The Merge is "Disabled" 1636 and the Merge Speed is the "Current" 1638 axis speed. Thus, as a result of executing the MCCM instruction 1600 in association with a two dimensional orthogonal space (e.g., Coordinated_sys), the positive radius 1670 or negative radius 1690 results therefrom.

The vector speed of the selected axes is equal to the specified speed in the units per second or percent of maximum speed of the coordinate system. Likewise, the vector acceleration or deceleration is equal to the specified acceleration/deceleration in the units per second squared or percent of maximum acceleration of the coordinate system. This path can be achieved by utilizing an MCCM instruction in the clockwise direction with a Move Type of Absolute or a Move Type of Incremental value.

Figure 17:
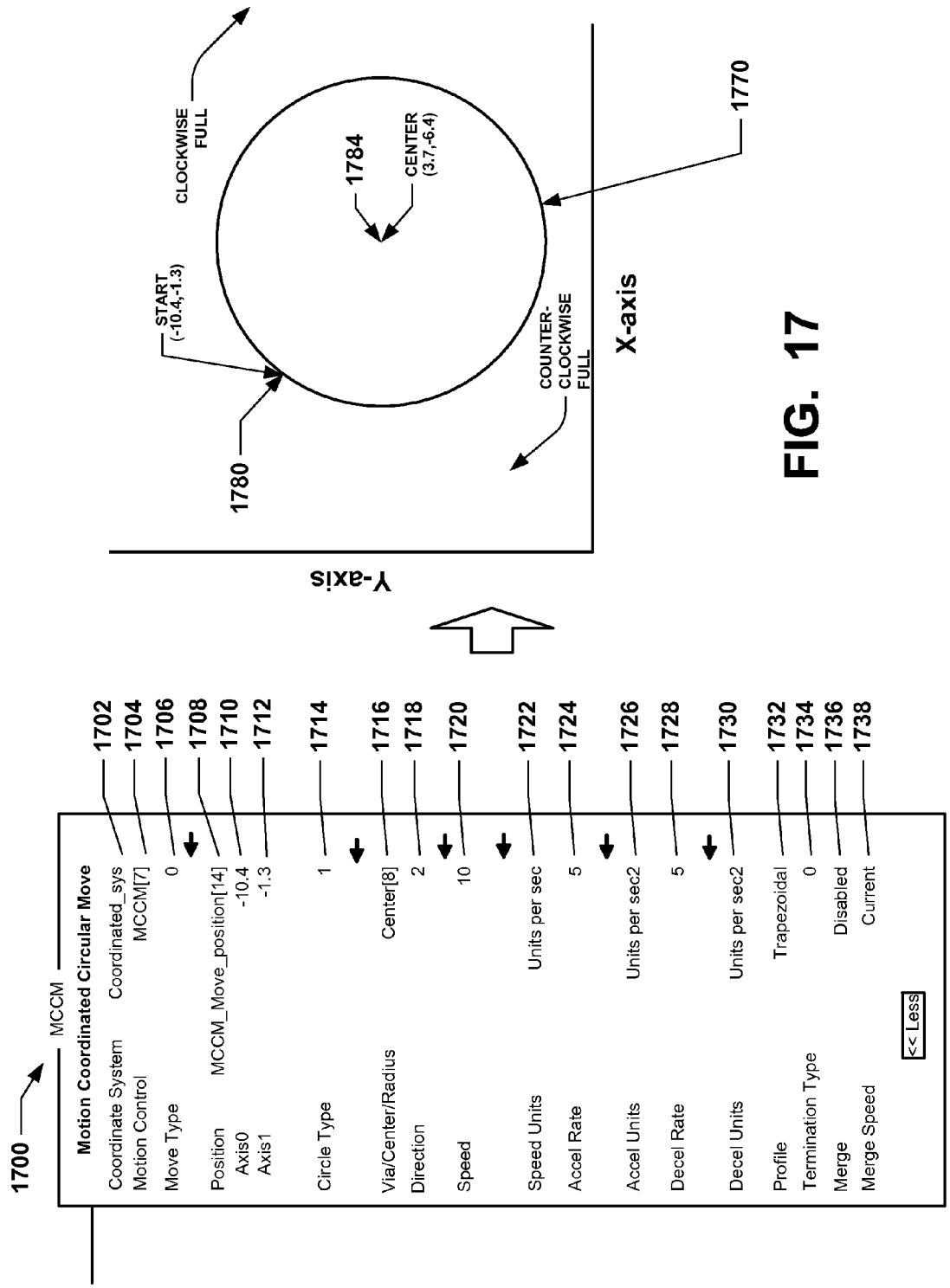
FIG. 17 shows an exemplary motion diagram, in accordance with an aspect of the current invention.

Turning now to FIG. 17, which shows an MCCM instruction 1700 with operands to facilitate motion in a full circle from a point 1780. In this example, a circle is defined by a first point 1780 (e.g., start) and a center point 1784. Motion begins and ends at the first point 1780 located at (−10.4,−1.3). A center point 1784 located at (3.7,−6.4) can be employed to define the move path of the circular motion in a 2-dimensional space wherein the dimensions are orthogonal to each other. The operands associated with the MCCM can be varied to accommodate various desired circular moves. In this example the operands are set to provide motion in a full circle and have the following values. The Coordinate System is "Coordinated_sys" 1702, the Motion Control is "MCCM[7]" 1704, the Move Type is "0" 1706. A "0" value for the operand Move Type indicates an absolute move type wherein the axes move via circular path to the position array at the Speed, Accel Rate and Decel Rate as specified by the operands. The Position 1708 is defined by Axis0 which is "−10.4" 1710 and Axis1 which is "−1.3" 1712 to specify an end start/stop location of (−10.4,−1.3). The Circle Type is "1" 1714 which can specify a center type indicative that the via/center/radius array members define the center of a circle. The Via/Center/Radius is "Center[8]" 1716 which indicates a center defined as an in absolute units as (3.7,−6.4) and the Direction is "2" 1718 which can indicate direction is clockwise full. The Speed is "10" 1720 and the Speed Units are given in "units per sec" 1722. The Accel Rate is "5" 1724 and the Accel Units are "units per sec2" 1726. The Decel Rate is "5" 1728 and the Decel Units are "units per sec2" 1730. The Profile is "Trapezoidal" 1732 which refers to the shape of the velocity profile versus time. The "Trapezoidal" velocity profile can provide flexibility in programming subsequent motion and can provide fast acceleration and deceleration times. The Termination Type is "0" 1734 which indicates an Actual Tolerance termination type. The Merge is "Disabled" 1736 and the Merge Speed is the "Current" 1738 axis speed. Thus, as a result of executing the MCCM instruction 1700 in association with a two dimensional orthogonal space (e.g., Coordinated_sys), the move 1770 results therefrom.

The vector speed of the selected axes is equal to the specified speed in the units per second or percent of maximum speed of the coordinate system. Likewise, the vector acceleration or deceleration is equal to the specified acceleration/deceleration in the units per second squared or percent of maximum acceleration of the coordinate system. This path can be achieved by utilizing an MCCM instruction in the clockwise direction with a Move Type of Absolute or a Move Type of Incremental value.

Figure 18:
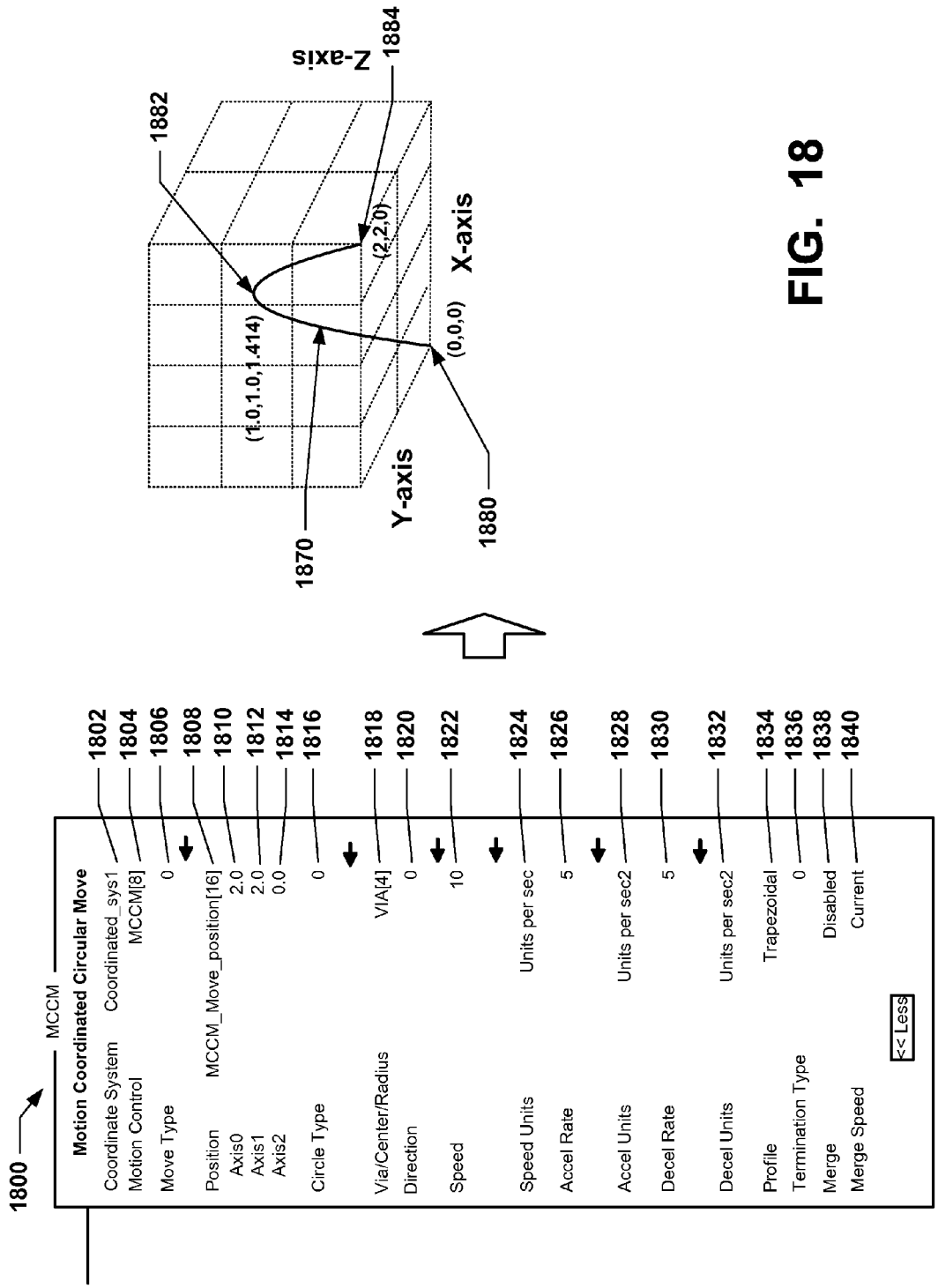
FIG. 18 shows an exemplary motion diagram, in accordance with an aspect of the current invention.

Referring now to FIG. 18, which shows an MCCM instruction 1800 with operands to facilitate motion in a three dimensional arc from a first point 1880 to a second point 1884. In this example, a three dimensional arc is defined by a first point 1880 (e.g., start), a second point 1884 (e.g., end) and a via point 1882. Motion begins at the first point 1880 located at (0.0,0.0,0.0) and ends at the second point 1882 located at (2.0,2.0,0.0). A via point 1882 located at (1.0,1.0,1.414) can be employed to define the move path of the arc in a three dimensional space wherein the dimensions are orthogonal to each other. The operands associated with the MCCM can be varied to accommodate various desired circular moves. In this example the operands are set to provide a three dimensional arc utilizing a via circle type and have the following values. The Coordinate System is "Coordinated_sys1" 1802 which is three dimensional, the Motion Control is "MCCM[8]" 1804, the Move Type is "0" 1806. A "0" value for the operand Move Type indicates an absolute move type wherein the axes move via circular path to the position array at the Speed, Accel Rate and Decel Rate as specified by the operands. The Position 1808 is defined by Axis0 which is "2.0" 1810, Axis1 which is "2.0" 1812 and Axis2 which is "0.0" 1814 to specify an end stop location of (2.0,2.0,0.0). The Circle Type is "0" 1816 which can specify a via type indicative that the via/center/radius array members define a position that can define a point through which the arc can pass. The Via/Center/Radius is "Via[4]" 1818 which indicates a via position defined in absolute units as (1.0,1.0,1.414) and the Direction is "0" 1820 which can indicate motion in the shortest direction but is ignored for a via circle type. The Speed is "10" 1822 and the Speed Units are given in "units per sec" 1824. The Accel Rate is "5" 1826 and the Accel Units are "units per sec2" 1828. The Decel Rate is "5" 1830 and the Decel Units are "units per sec2" 1832. The Profile is "Trapezoidal" 1834 which refers to the shape of the velocity profile versus time. The "Trapezoidal" velocity profile can provide flexibility in programming subsequent motion and can provide fast acceleration and deceleration times. The Termination Type is "0" 1836 which indicates an Actual Tolerance termination type. The Merge is "Disabled" 1838 and the Merge Speed is the "Current" 1840 axis speed. Thus, as a result of executing the MCCM instruction 1800 in association with a three dimensional orthogonal space (e.g., Coordinated_sys1), the move 1870 results therefrom.

The vector speed of the selected axes is equal to the specified speed in the units per second or percent of maximum speed of the coordinate system. Likewise, the vector acceleration or deceleration is equal to the specified acceleration/ deceleration in the units per second squared or percent of maximum acceleration of the coordinate system.

Referring now to FIG. 19A, which shows a semicircular path of motion 1900. The path 1900 can be comprised of four disparate instructions 1, 2, 3 and 4. Such instructions can be blended together utilizing various termination types such as contour with velocity constrained and contour with velocity unconstrained. The termination types velocity constrained and contour with velocity unconstrained are employed to maintain the path of motion during transition from one instruction the next (e.g., from instruction 1 to instruction 2). In general, for contour with velocity constrained and contour with velocity unconstrained, when the programmed velocity of the two instructions is different, the system will decelerate in the first instruction when the second instruction has a lower velocity than the first, and accelerate in the second instruction when the second velocity is greater than the first. FIGS. 19B, 19C and 19D illustrate velocity of the move versus time. FIG. 19B illustrates a vector velocity profile wherein the programmed speed is low and thus, the vector velocity of motion is constant once the low programmed speed has been achieved. FIG. 19C illustrates a velocity curve for contour with velocity constrained whereby a high programmed speed can be set and a termination type algorithm can vary the speed between instructions based on one or more instruction to be executed in a queue, for example. FIG. 19D shows the velocity curve for contour with velocity unconstrained termination type. Here, the velocity increases until instruction 2 is complete and then velocity is constantly decreased until instruction 4 is completed. The contour with velocity constrained can be employed when a series of short moves are desired since the user can program the speed desired for each move.

Figure 20:
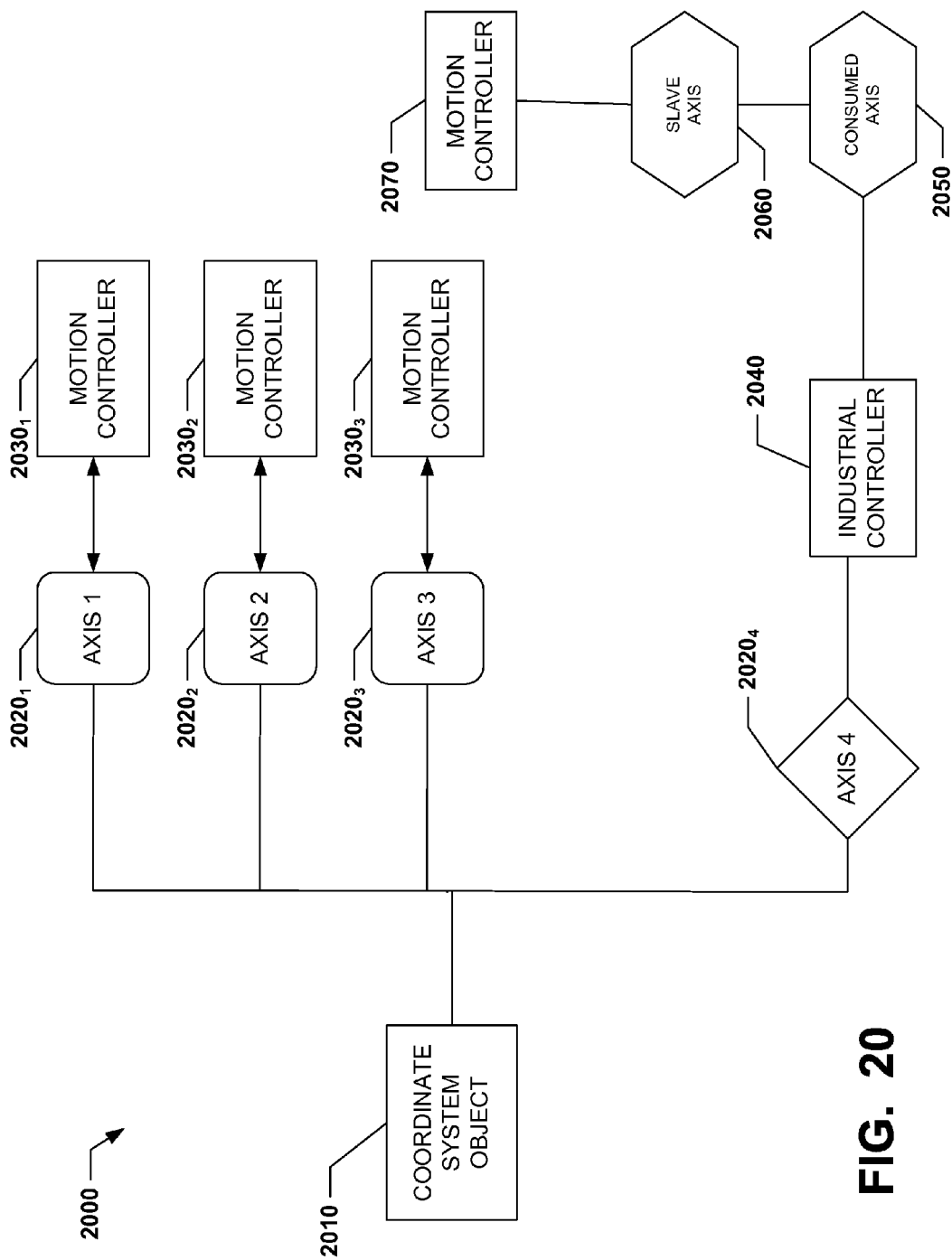
FIG. 20 shows an system environment, in accordance with an aspect of the current invention.

Turning now to FIG. 20, an exemplary system 2000 containing a coordinate system object (CSO) 2010 operatively connected to four axes (20201-20204). Each axis can be specified as either actual or virtual as desired by the user. In this particular example, axes 1-3 are actual axes and axis 4 is a virtual axis. It is to be appreciated, however, that the CSO 2010 can be associated with any number and types (e.g., actual, virtual, etc.) of axes. Further, although in this approach, axes 20201-20204 represent a one dimensional axis of motion (e.g., X, Y, Z, etc.), it is to be appreciated that axes 20201-20204 can represent more than one dimension of motion (e.g., XY, YZ, XYZ, etc.) to provide multiple nested motion configurations.

Each actual axis 20201-20203 has an associated motion controller (20301-20303) that can include several disparate control devices to provide control related to the motion of a desired component. Each actual axis 20201-20203 can relate to a unique set of corresponding devices. For example, motion controller 20301 can include a servo drive, a servo motor and a rotary encoder. In contrast, motion controller 20303 can include a stepper drive, a stepper motor and a linear encoder.

The CSO 2010 can be utilized to define the axes under control of the single object. In this manner, the CSO 2010 can serve as a single point of reference for coordinated motion control as described above. Thus, each axis 20201-20203 can have a set of attributes related to many different values such as speed, acceleration, deceleration, etc. Similarly, the CSO 2010 can have its own set of attributes wherein such parameters are related to one or more axes 20201-20203. Thus, the CSO 2010 can provide a single source of information (status, error codes, control bits, etc.) and aggregate such information to expose to a user for control implementation. For instance, the status of all axes related to the CSO 2010 can be monitored to provide a comprehensive view of the coordinated axes 2020.

The virtual axis 20204 can be associated with the same or different processors and can be employed as part of the coordinate system as shown in FIG. 20. Such a virtual axis 20204 can be related to one or more actual axes 20201-20203 and can interface to such actual axes in a number of ways. In this approach, the master is the virtual axis 20204 which communicates via industrial controller 2040 to a consumed axis 2050 and a slave axis 2060. Motion control of one or more control elements is facilitated via the motion controller 2070. Thus, the virtual axis is the master and is employed by one or more actual axes to provide gearing of such actual axes. It is to be understood that although the virtual axis 20204 is not associated with any hardware, it can nevertheless provide communication which simulates such a hardware connection.

Figure 21:
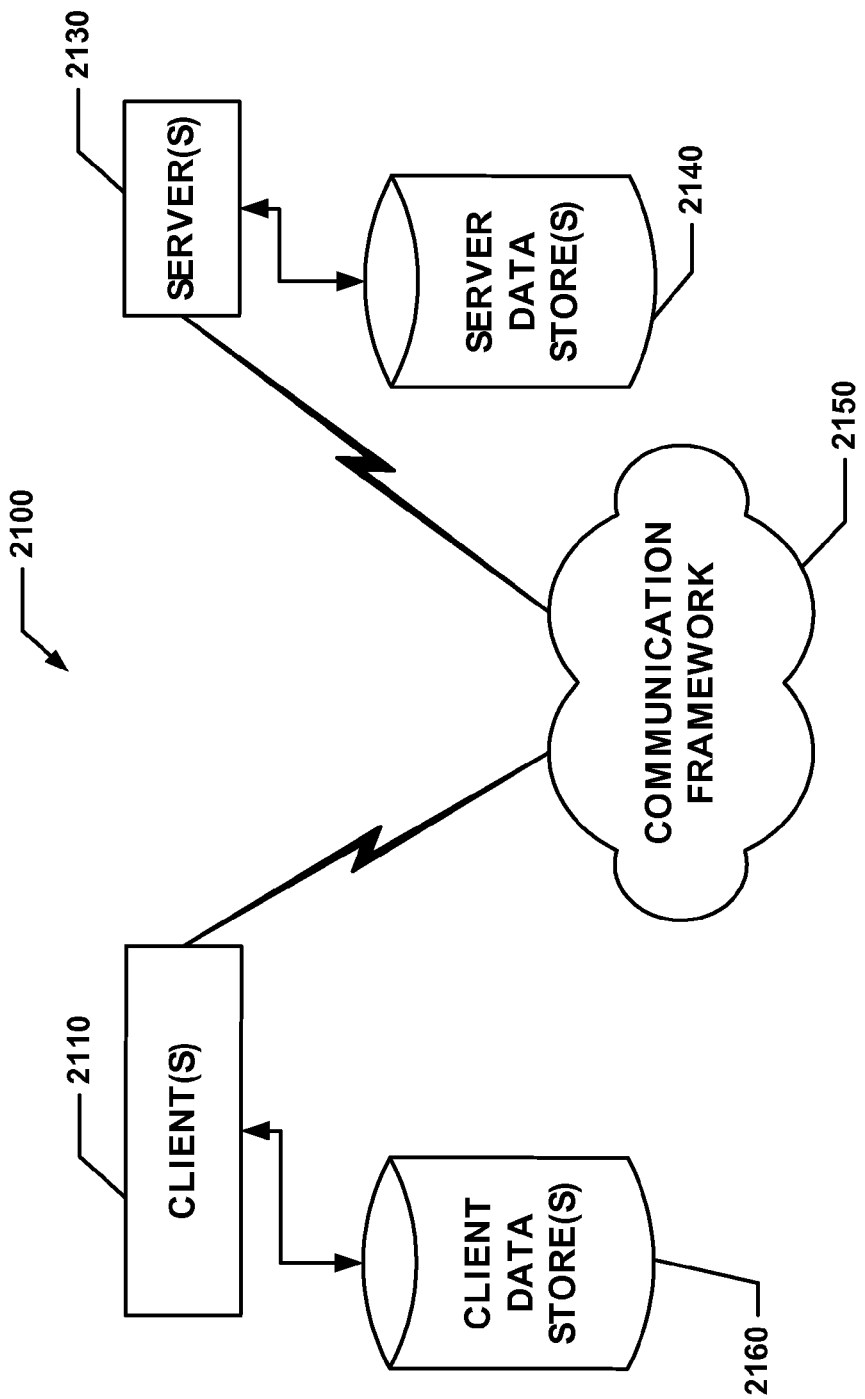
FIG. 21 shows an exemplary network, in accordance with an aspect of the current invention.

Turning now to FIG. 21, illustrates an exemplary computing environment 2100 in which the present invention can be employed. The system 2100 includes one or more client(s) 2110. The client(s) 2110 can be hardware and/or software (e.g., threads, processes, computing devices). The system 2100 additionally includes one or more server(s) 2130. Likewise, the server(s) 2130 can be hardware and/or software (e.g., threads, processes, computing devices).

One possible communication between a client 2110 and a server 2130 can be in the form of a data packet transmitted between two or more computer processes. The system 2100 further includes a communication framework 2150 that can be employed to facilitate communications between the client(s) 2110 and the server(s) 2130. The client(s) 2110 can interface with one or more client data store(s) 2160, which can be employed to store information local to the client(s) 2110. Similarly, the server(s) 2100 can interface with one or more server data store(s) 2140, which can be employed to store information local to the servers 2130.

Figure 22:
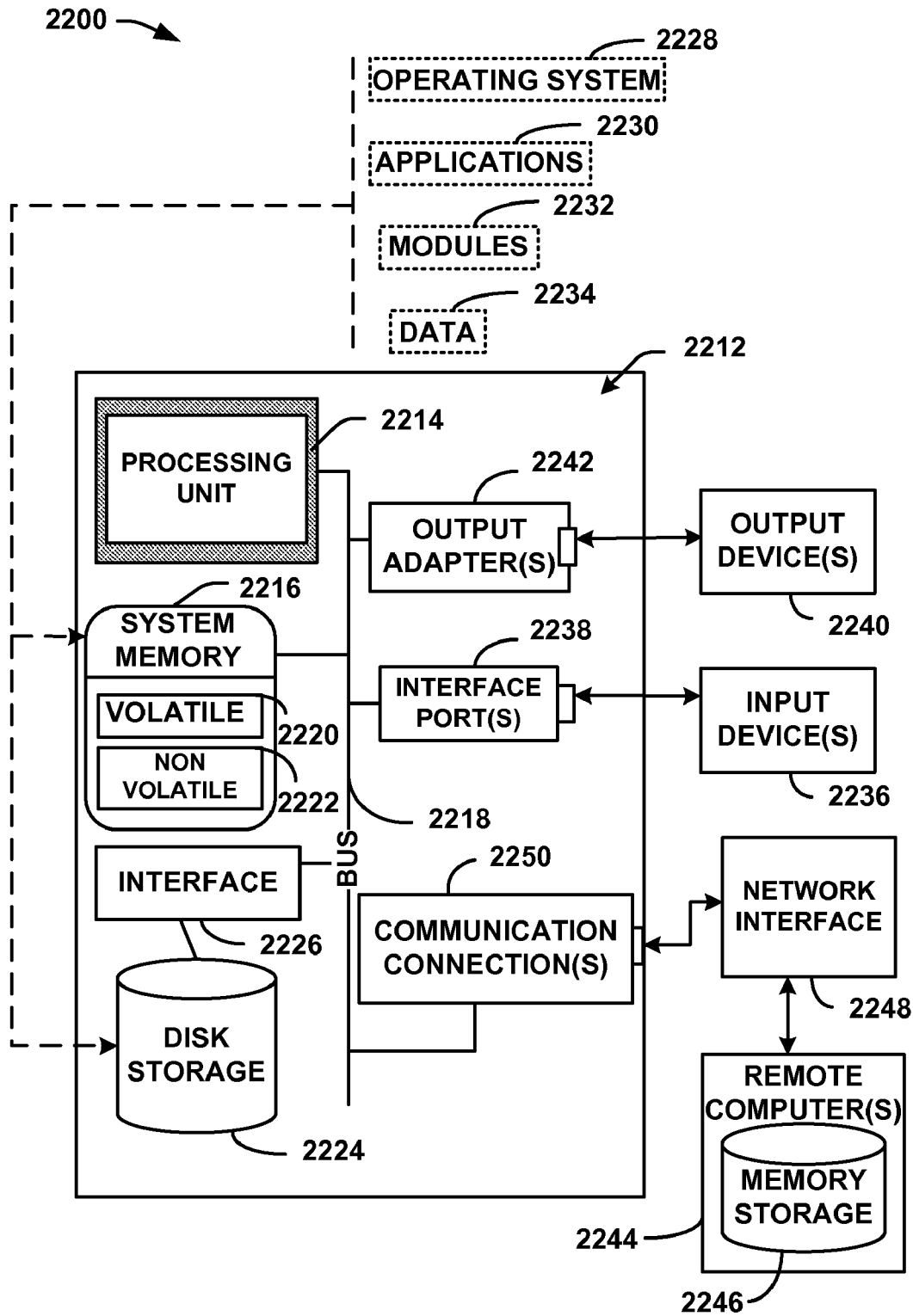
FIG. 22 illustrates an exemplary computing environment wherein the invention can be employed.

With reference to FIG. 22, an exemplary environment 2210 for implementing various aspects of the invention includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable ROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer system 2212. System applications 2230 take advantage of the management of resources by operating system 2228 through program modules 2232 and program data 2234 stored either in system memory 2216 or on disk storage 2224. It is to be appreciated that the present invention can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapter 2242 is provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A motion control system for an industrial controller comprising the following components:
   a processor;
   a memory communicatively coupled to the processor, the memory having stored therein computer-executable instructions to implement the system, including:
   a coordinated system operand that represents a plurality of axes of motion, the coordinated system operand links the plurality of axes of motion to provide multi-axis coordinated motion; and
   a processing component that executes at least one instruction on the coordinated system operand, the instruction is employed to act on at least one parameter associated with the plurality of axes of motion, wherein the executing at least one instruction is terminated utilizing one of actual tolerance, no settle, command tolerance, no decel, contour with velocity constrained, or contour with velocity unconstrained to affect transition path between path segments.

2. The system of claim 1, further comprising a queuing component employed to store subsequent instructions.

3. The system of claim 1, the at least one instruction is employed to stop motion related to all axis of motion associated with the instruction.

4. The system of claim 1, the at least one instruction is employed to stop all motion related to a single axis, which in turn stops all motion associated with the single axis.

5. The system of claim 1, further comprising a user interface in which displayable objects are employed to represent physical hardware and relationships between physical hardware.

6. The system of claim 1, further comprising an instruction bank containing at least one of a Motion Coordinated Linear Move instruction, a Motion Coordinated Circular Move instruction, a Motion Coordinated Change Dynamics instruction, a Motion Coordinated Stop instruction, a Motion Coordinated Shutdown instruction or a Motion Coordinated Shutdown Reset instruction.

7. The system of claim 6, wherein:
the Motion Coordinated Linear Move instruction is employed to initiate a multi-dimensional linear coordinated move within a coordinate system,
the Motion Coordinated Circular Move instruction is utilized to initiate one of a two-dimensional or a three dimensional circular coordinated move within the coordinate system,
the Motion Coordinated Change Dynamics instruction is employed to initiate a change in the path dynamics for the motion active within the coordinate system,
the Motion Coordinated Stop instruction is employed to initiate a controlled stop of a specified motion profile operative on a system,
the Motion Coordinated Shutdown instruction is employed to initiate a controlled shutdown of all the axes within the coordinate system, and
the Motion Coordinated Shutdown Reset instruction is employed to initiate a reset of a specified coordinate system from the shutdown state to the axis ready state and to clear the axis faults.

8. The system of claim 7, wherein:
the Motion Coordinated Linear Move instruction comprises at least one of the following operands: a coordinate system operand, a motion control operand, a move type operand, a position operand, a speed operand, a speed units operand, an accel rate operand, an accel units operand, a decel rate operand, a decel units operand, a profile operand, a termination type operand, a merge operand or a merge speed operand,
the Motion Coordinated Circular Move instruction comprises at least one the following operands: a coordinate system operand, a motion control operand, a move type operand, a position operand, a circle type operand, a via/center/radius operand, a direction operand, a speed operand, a speed units operand, an acceleration rate operand, an acceleration units operand, a deceleration rate operand, a profile operand, a termination type operand, a merge operand or a merge speed operand,
the Motion Coordinated Change Dynamics instruction comprises at least one of the following operands: a coordinate system operand, a motion control operand, a motion type operand, a change speed operand, a speed operand, a speed units operand, a change accel operand, an accel rate operand, an accel units operand, a change decel operand, a decel rate operand or a decel units operand,
the Motion Coordinated Stop instruction comprises at least one of the following operands: a coordinate system operand, a motion control operand, a stop type operand, a change decel operand, a decel rate operand or a decel units operand,
the Motion Coordinated Shutdown instruction comprises at least one of the following operands: a coordinate system operand or a motion control operand,
the Motion Coordinated Shutdown Reset instruction comprises at least one of the following operands: a coordinate system operand or a motion control operand.

9. The system of claim 7, the Motion Coordinated Circular Move at least one of:
provides motion employing at least one of the following motion types: circle via, circle center, circle radius or circle incremental;
specifies direction in one of the clockwise or counterclockwise direction; or
specifies one of an arc or a full circle.

10. The system of claim 1, wherein a plurality of currently executing motion instruction parameters are modified.

11. The system of claim 1, wherein a plurality of currently executing motion instructions are stopped along the path of programmed motion.

12. The system of claim 1, wherein a single axis instruction is stopped immediately thereby affecting the state of a plurality of currently executing motion instructions.

13. The system of claim 1, wherein details of path segments for the move instruction are displayed and modified utilizing a target position dialogue interface.

14. The system of claim 1, the transition path between path segments is accomplished using one of blended or non-blended termination types.

15. The system of claim 14, wherein:
the non-blended termination type is one of actual tolerance or no settle, and
the blended termination type is one of command tolerance, no decel, contour with velocity constrained and contour with velocity unconstrained.

16. A method to execute an instruction to effectuate motion control, comprising:
employing a processor executing computer executable instructions embodied on a computer readable storage medium to perform the following acts:
accessing a coordinated system operand that represents a plurality of axes of motion associated with a coordinate system, the coordinated system operand links the plurality of axes of motion to provide multi-axis coordinated motion; and
executing at least one instruction on the coordinated system operand to coordinate motion of the plurality of axes within the coordinate system, wherein the executing at least one instruction is terminated utilizing one of actual tolerance, no settle, command tolerance, no decel, contour with velocity constrained, or contour with velocity unconstrained to affect transition path between path segments.

17. A computer readable medium including computer executable instructions which when executed by a processor cause the processor to perform the following acts:
access a coordinated system operand that represents a plurality of axes of motion associated with a coordinate system, the coordinated system operand links the plurality of axes of motion to provide multi-axis coordinated motion; and
execute at least one instruction on the coordinated system operand to coordinate motion of the plurality of axes within the coordinate system, wherein the executing at least one instruction is terminated utilizing one of actual tolerance, no settle, command tolerance, no decel, contour with velocity constrained, or contour with velocity unconstrained to affect transition path between path segments.

* * * * *